(12) United States Patent
Okura et al.

(10) Patent No.: US 12,459,561 B2
(45) Date of Patent: Nov. 4, 2025

(54) WORK VEHICLE, CONTROL SYSTEM FOR WORK VEHICLE, AND CONTROL METHOD

(71) Applicant: KUBOTA CORPORATION, Osaka (JP)

(72) Inventors: Kohei Okura, Sakai (JP); Ryo Kurata, Sakai (JP); Kenta Hanajima, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 32 days.

(21) Appl. No.: 18/544,508

(22) Filed: Dec. 19, 2023

(65) Prior Publication Data

US 2024/0217578 A1 Jul. 4, 2024

(30) Foreign Application Priority Data

Dec. 28, 2022 (JP) ................. 2022-211141

(51) Int. Cl.
| | |
|---|---|
| *B62D 6/00* | (2006.01) |
| *A01B 69/04* | (2006.01) |
| *B60K 35/28* | (2024.01) |
| *G01S 19/43* | (2010.01) |
| *G05D 1/248* | (2024.01) |

(Continued)

(52) U.S. Cl.
CPC ............ *B62D 6/001* (2013.01); *A01B 69/008* (2013.01); *B60K 35/28* (2024.01); *G01S 19/43* (2013.01); *G05D 1/248* (2024.01); *G05D 1/65* (2024.01); *B60K 2360/178* (2024.01); *G05D 2105/15* (2024.01); *G05D 2107/21* (2024.01);

(Continued)

(58) Field of Classification Search
CPC ...... A01B 69/008; B62D 6/001; B60K 35/28; B60K 2360/178; G05D 1/248; G05D 1/65; G05D 2105/15; G05D 2105/2107; G05D 2105/21; G05D 2109/10; G05D 2111/52; G05D 2111/54
See application file for complete search history.

(56) References Cited

U.S. PATENT DOCUMENTS

| | | | |
|---|---|---|---|
| 7,451,029 B2 | 11/2008 | McLaren et al. | |
| 2006/0122754 A1* | 6/2006 | McLaren .............. | B60W 40/10 701/50 |

(Continued)

FOREIGN PATENT DOCUMENTS

| | | | |
|---|---|---|---|
| JP | 2001001938 A | | 1/2001 |
| JP | 2017046656 A | * | 3/2017 |

(Continued)

*Primary Examiner* — John M Zaleskas
(74) *Attorney, Agent, or Firm* — Keating & Bennett, LLP

(57) ABSTRACT

A work vehicle that performs auto-steer driving in forward travel and backward travel includes a position sensor to output chronological position data of the work vehicle, a controller configured or programmed to, in an automatic steering mode, perform steering control for the work vehicle based on the chronological position data and a target path that is previously set, and a toggling switch to switch between forward travel and backward travel of the work vehicle. In the automatic steering mode, when a moving speed of the work vehicle is lower than a first speed, the controller is configured or programmed to determine a traveling direction of the work vehicle based on the chronological position data and a state of the toggling switch.

13 Claims, 13 Drawing Sheets

(51) Int. Cl.
*G05D 1/65* (2024.01)
*G05D 105/15* (2024.01)
*G05D 107/20* (2024.01)
*G05D 109/10* (2024.01)
*G05D 111/50* (2024.01)

(52) U.S. Cl.
CPC ...... *G05D 2109/10* (2024.01); *G05D 2111/52* (2024.01); *G05D 2111/54* (2024.01)

(56) References Cited

U.S. PATENT DOCUMENTS

| | | | | |
|---|---|---|---|---|
| 2010/0318255 | A1* | 12/2010 | Li | B60W 30/06 701/31.4 |
| 2013/0211716 | A1* | 8/2013 | Kellar | G01C 21/188 701/472 |
| 2018/0027179 | A1* | 1/2018 | Matsuzaki | B60R 1/27 348/38 |
| 2018/0338407 | A1* | 11/2018 | Matsuzaki | B60T 7/18 |
| 2022/0007563 | A1* | 1/2022 | Suga | G05D 1/648 |
| 2022/0078962 | A1* | 3/2022 | Okura | A01B 69/004 |
| 2022/0104422 | A1* | 4/2022 | Takase | B60N 2/797 |
| 2022/0104423 | A1* | 4/2022 | Kikumoto | G05D 1/646 |
| 2022/0287218 | A1* | 9/2022 | Yuasa | B60K 31/00 |
| 2023/0031053 | A1* | 2/2023 | Kodama | A01B 69/008 |
| 2023/0320248 | A1* | 10/2023 | Tambo | B60Q 9/00 701/41 |
| 2023/0339557 | A1* | 10/2023 | Tambo | A01B 69/007 |
| 2024/0215473 | A1* | 7/2024 | Okura | G05D 1/248 |
| 2024/0351633 | A1* | 10/2024 | Son | B60W 10/04 |

FOREIGN PATENT DOCUMENTS

| | | |
|---|---|---|
| JP | 2017-76231 A | 4/2017 |
| JP | 2020-54316 A | 4/2020 |
| JP | 6766240 B1 | 10/2020 |
| JP | 2021112203 A | 8/2021 |
| WO | WO-2024089987 A1 * | 5/2024 |

* cited by examiner

WORK VEHICLE, CONTROL SYSTEM FOR WORK VEHICLE, AND CONTROL METHOD

CROSS-REFERENCE TO RELATED APPLICATION

This application claims priority to Japanese Patent Application No. 2022-211141, which was filed on Dec. 28, 2022, the entire contents of which are hereby incorporated by reference.

BACKGROUND OF THE INVENTION

1. Field of the Invention

The present disclosure relates to work vehicles, control systems for work vehicles, and control methods.

2. Description of the Related Art

Research and development has been directed to the automation of work vehicles, such as tractors, to be used in fields. For example, work vehicles have been put to practical use which travel via automatic steering by utilizing a positioning system capable of precise positioning, e.g., GNSS (Global Navigation Satellite System). Work vehicles that automatically perform speed control as well as automatic steering have also been put to practical use.

Japanese Laid-Open Patent Publication No. 2020-54316 discloses a technique for facilitating automatic steering during backward travel. The work vehicle disclosed in Japanese Laid-Open Patent Publication No. 2020-54316 includes a controller that, when automatic steering is begun with a steering toggling switch, gives a command for automatic steering of backward travel so that the vehicle will travel backwards along a scheduled line of travel, which corresponds to a reference line of travel.

SUMMARY OF THE INVENTION

A work vehicle traveling by automatic steering needs to accurately detect the traveling direction (i.e., forward travel or backward travel). The traveling direction can be determined based on signals from a sensor to detect the rotation direction of a gear included in the transmission, or position data in chronological order that is acquired by a positioning system such as GNSS, for example.

However, when the work vehicle is traveling at a very low speed (e.g., less than about 0.2 km/h), the traveling direction cannot be accurately detected by conventional methods.

Example embodiments of the present invention provide systems and methods for detecting traveling directions of work vehicles more accurately even when the work vehicles are traveling at a very low speed.

A work vehicle according to an illustrative example embodiment of the present disclosure is capable of performing auto-steer driving in both of forward travel and backward travel. The work vehicle includes a position sensor to output chronological position data of the work vehicle, a controller configured or programmed to, in an automatic steering mode, perform steering control for the work vehicle based on the chronological position data and a target path that is previously set, and a toggling switch to switch between forward travel and backward travel of the work vehicle, wherein in the automatic steering mode, when a moving speed of the work vehicle is lower than a first speed, the controller is configured or programmed to determine a traveling direction of the work vehicle based on the chronological position data and a state of the toggling switch.

General or specific aspects of various example embodiments of the present disclosure may be implemented using a device, a system, a method, an integrated circuit, a computer program, a non-transitory computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

According to an example embodiment of the present disclosure, it becomes possible to detect the traveling direction of a work vehicle more accurately even when the work vehicle is traveling at a very low speed.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
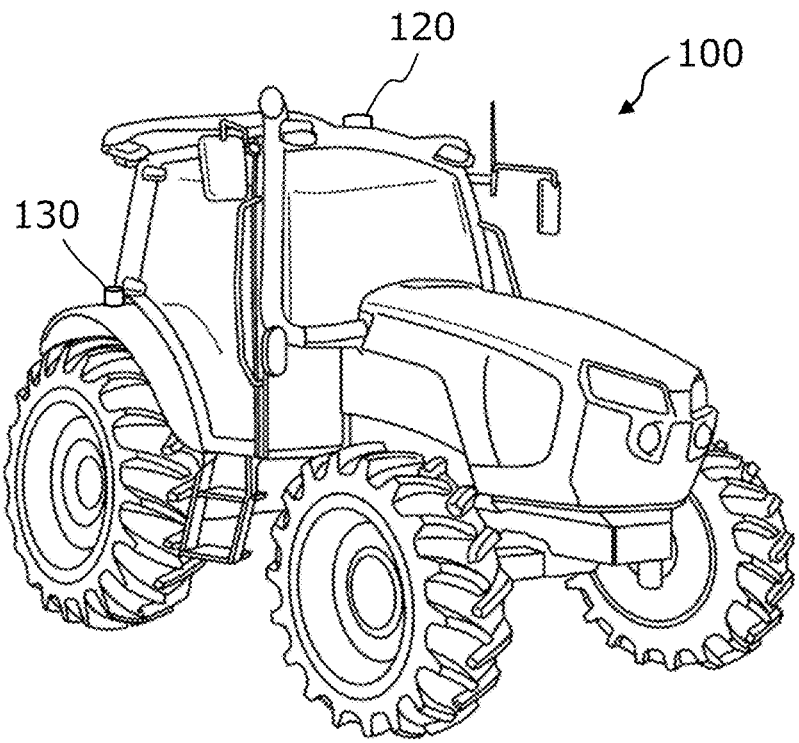
FIG. 1 is a perspective view showing an example appearance of a work vehicle according to Example Embodiment 1 of the present invention.

Hereinafter, example embodiments of the present disclosure will be described more specifically. Note however that un-necessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

The following example embodiments are only exemplary, and the techniques according to the present disclosure is not limited to the following example embodiments. For example, numerical values, shapes, steps, and orders of steps, layout of a display screen, etc., that are indicated in the following example embodiments are only exemplary, and admit of various modifications so long as it makes technological sense. Any one implementation may be combined with another so long as it makes technological sense to do so.

Hereinafter, example embodiments will be described in which the techniques of the present disclosure are applied to a tractor for agricultural use, as an example work vehicle. The techniques of the present disclosure are applicable to not only a tractor but also any work vehicle that is capable of traveling by automatic steering. The work vehicle may be a rice transplanter, a combine, a mower, a harvester, a snowplow vehicle, or a construction vehicle, for example.

A work vehicle and a control system for a work vehicle according to illustrative embodiments of the present disclosure will be described.

A work vehicle according to the present example embodiment includes a control system to perform control to achieve auto-steer driving. The control system may be a computer system that includes a storage device and a controller. The storage device includes one or more storage media to store various data, such as a target path for the work vehicle. The controller includes one or more computers, processors, or control circuits to control the operation of the work vehicle. The controller is configured or programmed to be capable of operating in both of an automatic steering mode and a manual steering mode. The controller switches between the automatic steering mode and the manual steering mode in response to a driver's manipulation, for example. In the automatic steering mode, the controller is configured or programmed to control steering of the work vehicle so that the work vehicle travels along a target path based on the position of the work vehicle as identified by a positioning device (position sensor) and the target path as stored in the storage device. The positioning device (position sensor) is disposed inside or outside the work vehicle. The positioning device (position sensor), which includes, e.g., a GNSS receiver, identifies the position of the work vehicle based on signals from a plurality of GNSS satellites, and outputs position data in chronological order. The positioning device (position sensor) may include any device other than a GNSS receiver, e.g., a LiDAR sensor (s) or a camera (s). Through matching between data that is acquired by the LiDAR sensor (s) or camera (s) and an environment map that is prepared in advance, the position of the work vehicle can be estimated. The target path is a path to serve as a target of traveling that is set within an area to be travelled by the work vehicle. The target path is set before beginning auto-steer driving, and is recorded in the storage device. The target path may be set within a field, for example.

A work vehicle according to the present example embodiment is capable of performing auto-steer driving in both of forward travel and backward travel. The work vehicle includes a toggling switch to switch between forward travel and backward travel of the work vehicle. In the automatic steering mode, the controller performs steering control for the work vehicle based on chronological position data that is output from the positioning device and a target path that is previously set. In the automatic steering mode, when the moving speed of the work vehicle is lower than a predetermined threshold (which is referred to as a "first speed"), the controller determines a traveling direction of the work vehicle based on the chronological position data and a state of the toggling switch. Herein, the "moving speed" means the magnitude (absolute value) of the speed with which the work vehicle moves, and is also referred to as "vehicle speed". In the following description, the moving speed during backward travel may in particular be referred to as "backward speed". The "traveling direction determination" means, rather than a strict determination of a direction of move, determining whether the work vehicle is traveling forward or traveling backward (or at a halt). The first speed may be set to a very low speed, e.g., about 0.2 kilometers per hour (about 0.2 km/h). In the following description, such a low speed range may be referred to as an "extremely low speed range".

While the work vehicle is moving in an extremely low speed range, it is difficult for any conventional method to determine the actual traveling direction of the work vehicle, i.e., whether it is traveling forward or traveling backward. In the case where the work vehicle is moving at a speed of about 0.5 km/h or more, for example, a sensor to detect the rotation of a gear that is included in the transmission, etc., may be utilized to accurately detect the traveling direction of the work vehicle. Even in a low speed range below about 0.5 km/h, so long as the moving speed is, e.g., about 0.2 km/h or above, the traveling direction can be determined somewhat accurately based on chronological position data from a highly accurate positioning device such as an RIK (Real Time Kinematic)-GNSS. However, in an extremely low speed range where the moving speed is e.g., below about 0.2 km/h, fluctuations in the position data may hinder an accurate determination of the traveling direction even if a highly accurate positioning device such as an RIK-GNSS is used. For example, in the automatic steering mode, if the driver makes a manipulation of switching between forward travel and backward travel of the work vehicle in an extremely low speed range, it is difficult to accurately determine whether the work vehicle is traveling forward or traveling backward. Therefore, there has been a problem in that, in an extremely low speed range, automatic steering or other control that is based on a result of determining the traveling direction of the work vehicle cannot be continued with reliability.

In order to solve such a problem, in an extremely low speed range below the first speed, the controller according to the present example embodiment determines the traveling direction (i.e., forward travel or backward travel) of the work vehicle based on not only the chronological position data that is acquired by the positioning device but also the state of a toggling switch (e.g., a shuttle lever or a shuttle switch) to switch between forward travel and backward travel. For example, the controller may be configured or programmed so that, when a traveling direction that is estimated from the chronological position data and a traveling direction that is indicated by the toggling switch coincide, the controller determines that the work vehicle is moving in that traveling direction.

By adopting such a method of determination, even in an extremely low speed range where the traveling direction determination based on chronological position data that is output from the signal positioning device has low reliability, it becomes possible to improve the reliability of traveling direction determination by considering information indicating the state of a toggling switch such as a shuttle lever. As a result, the reliability of automatic steering in an extremely low speed range can be improved.

Hereinafter, the configuration and operation of a work vehicle according to the present example embodiment will be described in more detail.

Figure 2:
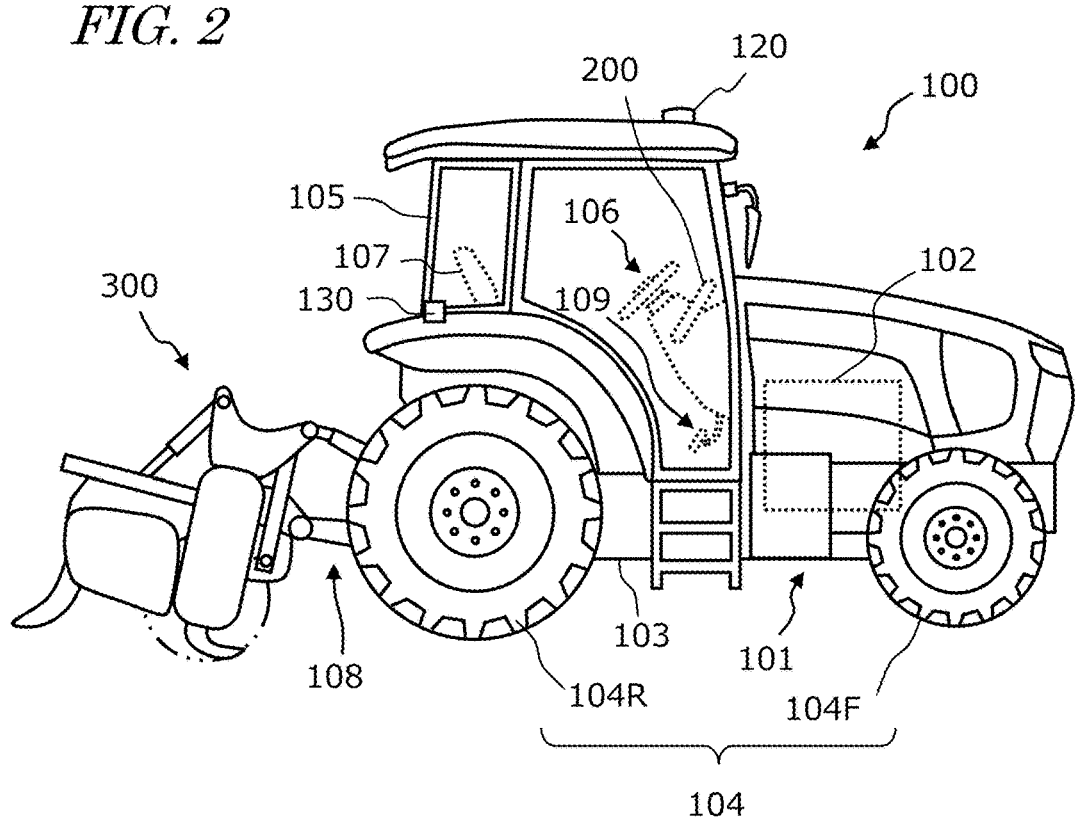
FIG. 2 is a side view schematically showing the work vehicle and an example of an implement that is linked to the work vehicle.

FIG. 1 is a perspective view showing an example appearance of a work vehicle 100 according to the present example embodiment. FIG. 2 is a side view schematically showing the work vehicle 100 and an example of an implement 300 that is linked to the work vehicle 100. The work vehicle according to the present example embodiment is, for example, a tractor for use in a field. The techniques according to the present example embodiment are also applicable to work vehicles other than tractors.

The work vehicle 100 according to the present example embodiment includes a positioning device 120 and one or more obstacle sensors 130. Although FIG. 1 illustrates one obstacle sensor 130, obstacle sensors 130 may be provided at a plurality of positions of the work vehicle 100. The obstacle sensor (s) 130 is to be provided as necessary. If not needed, the obstacle sensors 130 may be omitted from the work vehicle 100.

As shown in FIG. 2, the work vehicle 100 includes a vehicle body 101 a prime mover (engine) 102, and a transmission 103. On the vehicle body 101, wheels (e.g., tires) 104 and a cabin 105 are provided. The wheels 104 include a pair of front wheels 104F and a pair of rear wheels 104R. Inside the cabin 105, a driver's seat 107, a steering device 106, a plurality of pedals 109, an operational terminal 200, and switches for manipulation are provided. Either one or both of each front wheel 104F and each rear wheel 104R may be replaced by a plurality of wheels on which a track is worn (i.e., a crawler), rather than tires.

The positioning device 120 (position sensor) in the present example embodiment includes a GNSS receiver. The GNSS receiver may include an antenna to receive a signal (s) from a GNSS satellite (s) and a processor to determine the position of the work vehicle 100 based on the signal (s) received by the antenna. The positioning device 120 receive GNSS signals transmitted from a plurality of GNSS satellites, and performs positioning on the basis of the GNSS signals. GNSS is a general term for satellite positioning systems, such as GPS (Global Positioning System), QZss (Quasi-Zenith Satellite System, e.g., MICHIBIKI), GLONASS, Galileo, BeiDou, and the like. Although the positioning device 120 in the present example embodiment is disposed above the cabin 105, it may be disposed at any other position.

The positioning device 120 may include an inertial measurement unit (IMU). By using a signal from the IMU, it is possible to complement the position data. The IMU can measure tilts and minute motions of the work vehicle 100. By complementing or correcting the position data based on the satellite signals using the data acquired by the IMU, the positioning performance can be improved.

Instead of or in addition to the GNSS receiver, the positioning device 120 may include any other type of device, such as a LiDAR sensor (s) or a camera (s) (including an image sensor). When objects serving as characteristic points exist in the environment that is traveled by the work vehicle 100, the position of the work vehicle 100 can be estimated with a high accuracy based on data that is acquired with the LiDAR sensor (s) or camera (s) and an environment map that is previously recorded in a storage device 170. The LiDAR sensor (s) or camera (s) may be used together with the GNSS receiver. By correcting or complementing position data based on the GNSS signal (s) using the data acquired by the LiDAR sensor (s) or camera (s), it becomes possible to identify the position of the work vehicle 100 with a higher accuracy.

In the examples shown in FIGS. 1 and 2, the obstacle sensor (s) 130 is provided at the rear of the vehicle body 101. The obstacle sensor (s) 130 may be disposed at any other position than the rear of the vehicle body 101. For example, one or more obstacle sensors 130 may be disposed at any position selected from among the sides of the vehicle body 101, the front of the vehicle body 101, and the cabin 105. The obstacle sensor (s) 130 detects objects around the work vehicle 100. Each obstacle sensor 130 may include a laser scanner or an ultrasonic sonar, for example. When an object exists at a position closer to the obstacle sensor (s) 130 than a predetermined distance, the obstacle sensor (s) 130 outputs a signal indicating the presence of an obstacle. A plurality of obstacle sensors 130 may be provided at different positions of the body of the work vehicle 100. For example, a plurality of laser scanners and a plurality of ultrasonic sonars may be disposed at different positions of the body. Providing a multitude of obstacle sensors 130 can reduce blind spots in monitoring obstacles around the work vehicle 100. As aforementioned, the work vehicle 100 does not need to include the obstacle sensor (s) 130.

The prime mover 102 may be a diesel engine, for example. Instead of a diesel engine, an electric motor may be used. The transmission 103 can change the propulsion and moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force for changing the steering angle of the front wheels 104F. When automatic steering is performed, under the control of a controller disposed in the work vehicle 100, the steering angle may be automatically adjusted by the power of the hydraulic device or electric motor.

The plurality of pedals 109 include an accelerator pedal, a clutch pedal, and a brake pedal. On each pedal, a sensor to detect stepping is provided.

A linkage device 108 is provided at the rear of the vehicle body 110. The linkage device 108 may include, e.g., a three-point linkage (also referred to as a "three-point link" or a "three-point hitch"), a PTO (Power Take Off) shaft, a universal joint, and a communication cable. The linkage device 108 allows the implement 300 to be attached to or detached from the work vehicle 100. The linkage device 108 is able to raise or lower the three-point linkage device with a hydraulic device, for example, thus controlling the position or pose of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 110. In that case, the implement may be connected frontward of the work vehicle 100.

Although the implement 300 shown in FIG. 2 is a rotary tiller, the implement 300 is not limited to a rotary tiller. For example, any arbitrary implement such as a mower, a seeder, a spreader, a transplanter, a rake implement, a baler, a harvester, a sprayer, or a harrow, may be connected to the work vehicle 100 for use.

Figure 3:
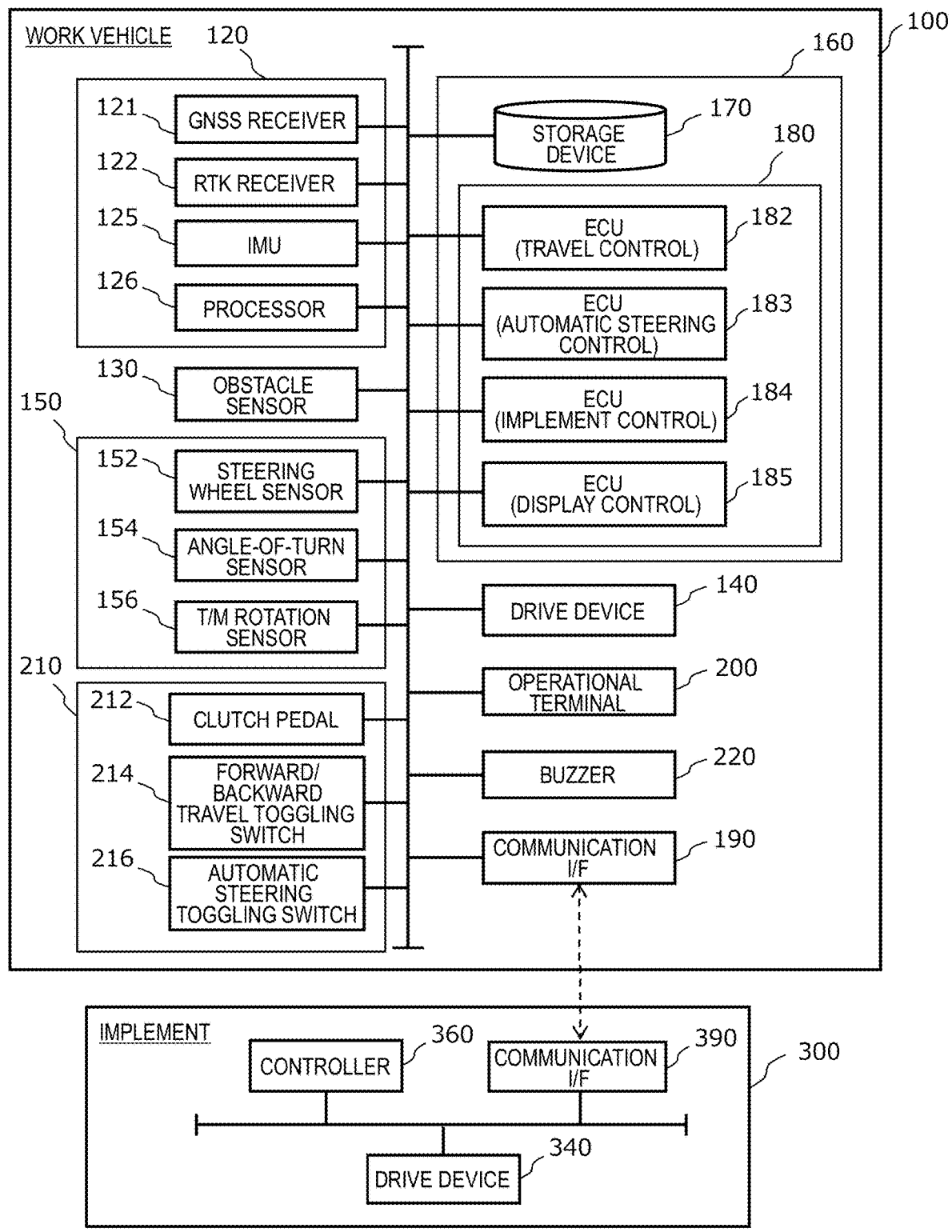
FIG. 3 is a block diagram showing an example of a schematic configuration of the work vehicle and the implement.

FIG. 3 is a block diagram showing an example of a schematic configuration of the work vehicle 100 and the implement 300. The work vehicle 100 and the implement 300 can communicate with each other via a communication cable that is included in the linkage device 108.

In addition to the positioning device 120, the obstacle sensor (s) 130, and the operational terminal 200, the work vehicle 100 in the example of FIG. 3 includes a drive device 140, sensors 150, a control system 160, a communication interface (I/F) 190, operation switches 210, and a buzzer 220. These component elements are connected to one another so as to be capable of communication via buses. The positioning device 120 includes a GNSS receiver 121, an RIK receiver 122, an inertial measurement unit (IMU) 125, and a processor 126. The sensors 150 may include a steering wheel sensor 152, an angle-of-turn sensor 154, and a transmission (T/M) rotation sensor 156, for example. The switches 210 may include a clutch pedal 212, a toggling switch 214 to switch between forward travel and backward travel, and a switch 216 to switch between automatic steering mode and manual steering mode, for example. The control system 160 includes the storage device 170 and a controller 180. The controller 180 includes a plurality of electronic control units (ECU) 182, 183, 184 and 185. The implement 300 includes a drive device 340, a controller 380, and a communication interface (I/F) 390. Note that FIG. 3 shows component elements which are relatively closely related to the operation of automatic steering or self-driving by the work vehicle 100, while other component elements are omitted from illustration.

The GNSS receiver 121 in the positioning device 120 receives satellite signals that are transmitted from a plurality of GNSS satellites, and generates GNSS data based on the satellite signals. The GNSS data is generated in a predetermined format such as NMEA-0183 format, for example. The GNSS data may include values indicating an ID number, an angle of elevation, an azimuth angle, and a receiving intensity of each satellite from which the satellite signal was received, for example.

Figure 4:
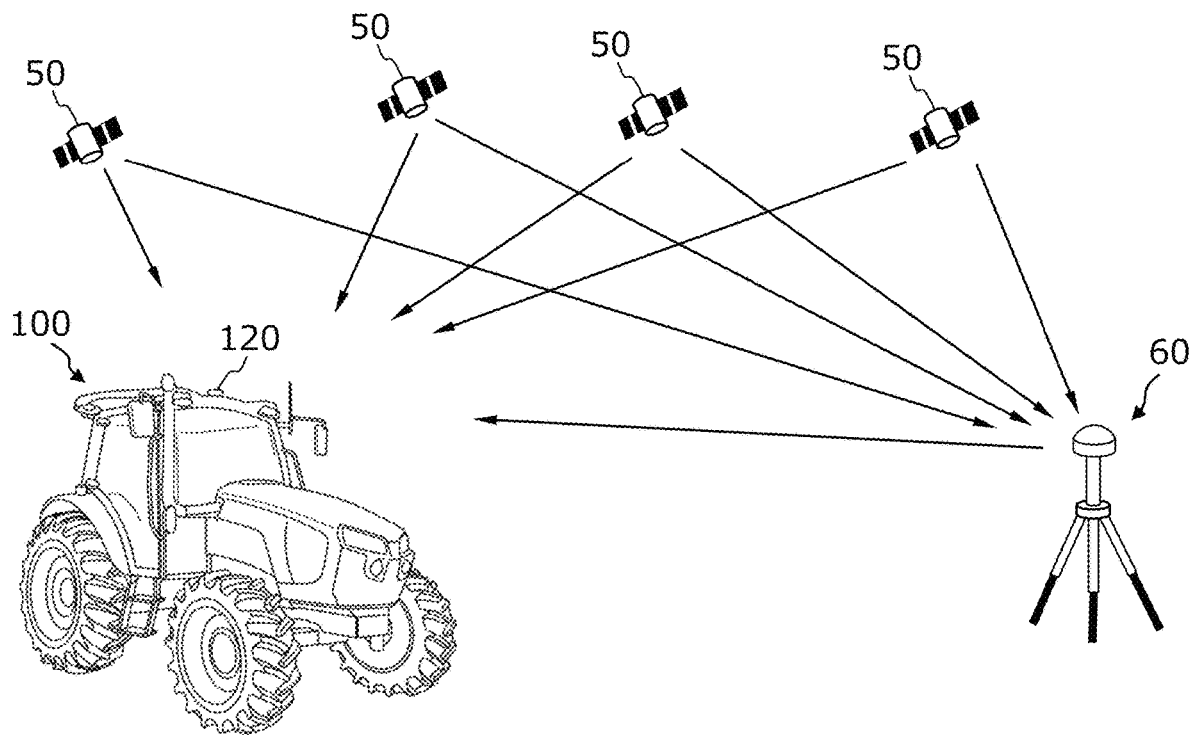
FIG. 4 is a conceptual diagram showing an example of the work vehicle which performs positioning based on an RTK-GNSS.

The positioning device 120 shown in FIG. 3 performs positioning of the work vehicle 100 by utilizing an RTK (Real Time Kinematic)-GNSS. FIG. 4 is a conceptual diagram showing an example of the work vehicle 100 which performs positioning based on an RTK-GNSS. In the positioning based on an RTK-GNSS, not only satellite signals transmitted from a plurality of GNSS satellites 50, but also a correction signal that is transmitted from a reference station 60 is used. The reference station 60 may be disposed near the field in which the work vehicle 100 performs tasked travel (e.g., at a position within about 10 km of the work vehicle 100). The reference station 60 generates a correction signal of e.g., an RTCM format based on the satellite signals received from the plurality of GNSS satellites 50, and transmits the correction signal to the positioning device 120. The RTK receiver 122, which includes an antenna and a modem, receives the correction signal transmitted from the reference station 60. Based on the correction signal, the processor 126 of the positioning device 120 corrects the result of positioning by the GNSS receiver 121. Use of an RTK-GNSS enables positioning with an accuracy on the order of several cm of errors, for example. Positional information (including latitude, longitude, and altitude information) is acquired through the highly accurate positioning by an RIK-GNSS. The positioning device 120 may calculate the position of the work vehicle 100 as frequently as, e.g., one to ten times per second. The positioning device 120 outputs chronological position data containing information of the calculated position (coordinates).

Note that the positioning method is not limited to an RTK-GNSS. Any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the positioning device 120 may lack the RTK receiver 122.

The positioning device 120 shown in FIG. 3 further includes the IMU 125. The IMU 125 includes a 3-axis accelerometer and a 3-axis gyroscope. The IMU 125 may include a direction sensor such as a 3-axis geomagnetic sensor. The IMU 125 functions as a motion sensor which can output signals representing parameters such as acceleration, velocity, displacement, and pose of the work vehicle 100. Based not only on the GNSS signals and the correction signal but also on a signal that is output from the IMU 125, the processor 126 of the positioning device 120 can estimate the position and orientation of the work vehicle 100 with a higher accuracy. The signal that is output from the IMU 125 may be used for the correction or complementation of the position that is calculated based on the GNSS signals and the correction signal. The IMU 125 outputs a signal more frequently than the GNSS signals. Utilizing this highly frequent signal allows the position and orientation of the work vehicle 100 to be measured more frequently (e.g., about 10 Hz or above). Instead of the IMU 125, a 3-axis accelerometer and a 3-axis gyroscope may be separately provided. The IMU 125 may be provided as a separate device from the positioning device 120. Note that at least a portion of the functionality of the processor 126 of the positioning device 120 may be achieved by one of the ECUs of the controller 180.

Instead of or in addition to the GNSS receiver 121, the RTK receiver 122, and the IMU 125, the positioning device 120 may include other types of sensors, such as a LiDAR sensor (s) or an image sensor (s). If any object exists in the environment traveled by the work vehicle 100 that may serve as a landmark, the position and orientation of the work vehicle 100 can be estimated through matching between the sensor data that is output from such a sensor (s) and an environment map. In such a configuration, an external sensor (s) such as the LiDAR sensor (s) or image sensor (s) may be included in the positioning device.

For example, the drive device 140 may include various devices that are needed for the traveling of the work vehicle 100 and the driving of the implement 300, e.g., the aforementioned prime mover 102, transmission 103, steering device 106, and linkage device 108. The prime mover 102 may include an internal combustion engine such as a diesel engine. Instead of an internal combustion engine or in addition to an internal combustion engine, the drive device 140 may include an electric motor that is dedicated to traction purposes.

The steering wheel sensor 152 measures the angle of rotation of the steering wheel of the work vehicle 100. The angle-of-turn sensor 154 measures the angle of turn of the front wheels 104F, which are the wheels responsible for steering.

The T/M rotation sensor 156 is a sensor to measure the rotational speed, i.e., the number of revolutions per unit time, of a wheel axis that is connected to a wheel 104. The T/M rotation sensor 156 may be a sensor including a magnetoresistive element (MR), a Hall generator, or an electromagnetic pickup, for example. The T/M rotation sensor 156 may output a pulse signal that is in proportion to the rotational speed of a gear that is included in the transmission, for example. The T/M rotation sensor 156 is used to determine the vehicle speed and traveling direction of the work vehicle 100.

Measurement values by the steering wheel sensor 152, the angle-of-turn sensor 154, and the T/M rotation sensor 156 are used for the steering control by the controller 180.

The storage device 170 includes one or more storage media such as a flash memory or a magnetic disc. The storage device 170 stores various data that is generated by the sensors and the controller 180. The data that is stored by the storage device 170 may include map data in the environment that is traveled by the work vehicle 100, and data of a target path of automatic steering. The storage device 170 also stores a computer program (s) to cause the ECUs in the controller 180 to perform various operations to be described later. Such a computer program (s) may be provided for the work vehicle 100 via a storage medium (e.g., a semiconductor memory or an optical disc) or through telecommunication lines (e.g., the Internet). Such a computer program (s) may be marketed as commercial software.

The controller 180 includes a plurality of ECUs. The plurality of ECUs include an ECU 182 for travel control, an ECU 183 for automatic steering control, an ECU 184 for implement control, and an ECU 185 for display control. The ECU 182 controls the prime mover 102, the transmission 103, the accelerator, and the brakes included in the drive device 140, thus controlling the speed of the work vehicle 100. The ECU 182 controls the hydraulic device or electric motor included in the steering device 106 based on a measurement value of the steering wheel sensor 152, thus controlling the steering of the work vehicle 100. The ECU 183 performs computations and controls to achieve auto-steer driving, based on signals which are output from the positioning device 120, the steering wheel sensor 152, the angle-of-turn sensor 154, the T/M rotation sensor 156, and the like. During auto-steer driving, the ECU 183 sends the ECU 182 a command to change the steering angle. In response to this command, the ECU 182 controls the steering device 106 to change the steering angle. In order to cause the implement 300 to perform a desired operation, the ECU 184 controls the operation of the linkage device 108. Also, the ECU 184 generates a signal to control the operation of the implement 300, and transmits this signal from the communication I/F 190 to the implement 300. The ECU 185 controls displaying on the operational terminal 200. For example, the ECU 185 may cause a display device of the operational terminal 200 to present various indications, e.g., a map of the field, the position of the work vehicle 100 and a target path in the map, pop-up notifications, and setting screens.

Through the action of these ECUs, the controller 180 realizes driving via manual steering or automatic steering. During auto-steer driving, the controller 180 controls the drive device 140 based on the position of the work vehicle 100 as measured or estimated by the positioning device 120 and the target path stored in the storage device 170. As a result, the controller 180 can cause the work vehicle 100 to travel along the target path.

The plurality of ECUs included in the controller 180 may communicate with one another according to a vehicle bus standard such as CAN (Controller Area Network). Although the ECUs 182, 183, 184 and 185 are illustrated as individual corresponding blocks in FIG. 3, each of these functions may be implemented by a plurality of ECUs. Alternatively, an onboard computer that integrates the functions of at least some of the ECUs 182, 183, 184 and 185 may be provided. The controller 180 may include ECUs other than the ECUs 182, 183, 184 and 185. Any number of ECUs may be provided in accordance with functionality. Each ECU includes a control circuit including one or more processors.

The communication I/F 190 is a circuit that performs communications with the communication I/F 390 of the implement 300. The communication I/F 190 performs exchanges of signals complying with an ISOBUS standard such as ISOBUS-TIM, for example, between itself and the communication I/F 390 of the implement 300. This causes the implement 300 to perform a desired operation, or allows information to be acquired from the implement 300. Moreover, the communication I/F 190 can communicate with an external computer via a wired or wireless network. The external computer may be a server computer in a farming support system which centralizes management of information concerning fields by using a cloud, and assists in agriculture by utilizing the data on the cloud, for example.

The operational terminal 200 is a terminal for the user to perform a manipulation related to the traveling of the work vehicle 100 and the operation of the implement 300, and may also be referred to as a virtual terminal (VT). The operational terminal 200 may include a display device such as a touch screen panel, and/or one or more buttons. By manipulating the operational terminal 200, the user can perform various manipulations, such as switching ON/OFF the automatic steering mode, setting an initial position of the work vehicle 100, setting a target path, recording or editing a map, and switching ON/OFF the implement 300. At least some of these manipulations can also be realized by manipulating the operation switches 210. As examples of the operation switches 210, FIG. 3 show the clutch pedal 212, the forward/backward travel toggling switch 214, and the automatic steering toggling switch 216. Displaying on the operational terminal 200 is controlled by the ECU 185.

The buzzer 220 is an audio output device to present an alarm sound to alert the user of an abnormality. For example, during auto-steer driving, the buzzer 220 may present an alarm sound when the work vehicle 100 has veered away from the target path by a predetermined distance or more. Instead of the buzzer 220, a loudspeaker of the operational terminal 200 may provide a similar function.

The drive device 340 in the implement 300 performs a necessary operation for the implement 300 to perform a predetermined task. The drive device 340 includes devices adapted to the intended use of the implement 300, e.g., a pump, a hydraulic device, an electric motor, or a pump. The controller 380 controls the operation of the drive device 340. In response to a signal that is transmitted from the work vehicle 100 via the communication IF 390, the controller 380 causes the drive device 340 to perform various operations. Moreover, a signal that is in accordance with the state of the implement 300 may be transmitted from the communication I/F 390 to the work vehicle 100.

Figure 5:
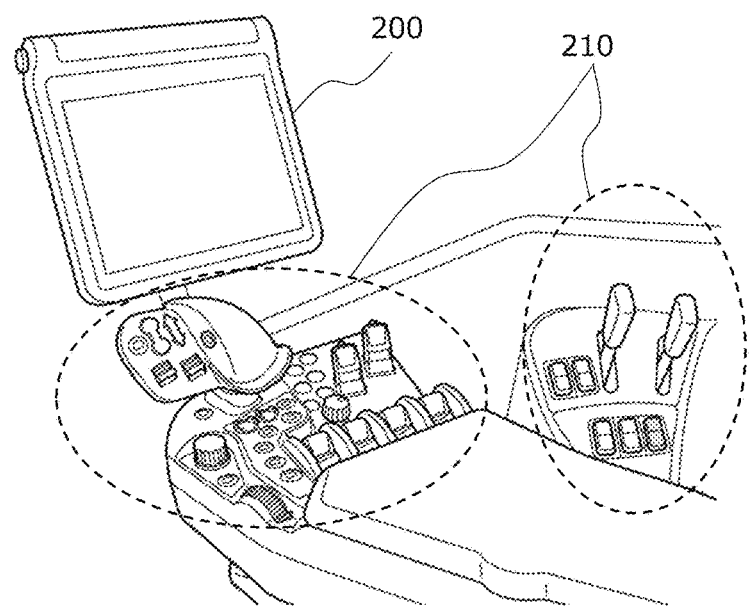
FIG. 5 is a diagram showing an example of an operational terminal and operation switches to be provided in a cabin.

FIG. 5 is a diagram showing an example of the operational terminal 200 and operation switches 210 to be provided in the cabin 105. In the cabin 105, switches 210, including a multitude of switches that are manipulable to the user, are disposed. The switches 210 may include, for example, the switch 216 to switch between automatic steering mode and manual steering mode, the toggling switch 214 to switch between forward travel and backward travel (e.g., a shuttle lever or a shuttle switch), a switch to select the gear shift as to a main gear shift or a range gear shift, and a switch to raise or lower the implement 300. The plurality of pedals 109 (e.g., the clutch pedal 212), which are not shown in FIG. 5, may also be included among the switches 210.

Next, the operation of the work vehicle 100 will be described. The controller 180 in the present example embodiment is able to switch between a manual steering mode and an automatic steering mode in response to a manipulation by a user (e.g., a driver) of the work vehicle 100. In the manual steering mode, the controller 180 controls steering by driving the power steering device in response to the user's manipulation of the steering wheel. In the automatic steering mode, the controller 180 controls steering by driving the power steering device based on the position of the work vehicle 100 as measured by the positioning device 120 and a previously-recorded target path. In the automatic steering mode, too, speed of the vehicle is adjustable through accelerating operations and braking operations by the user.

Figure 6A:
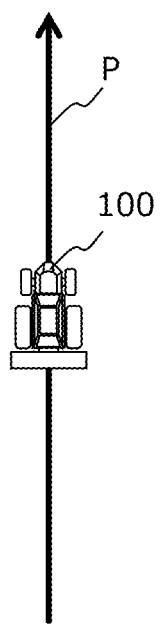
FIGS. 6A to 6C are diagrams showing examples of travel of the work vehicle in an automatic steering mode.
Figure 6B:
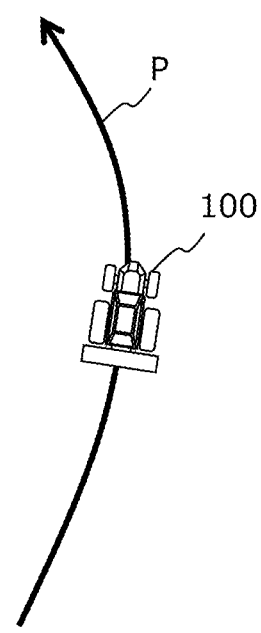
Figure 6C:
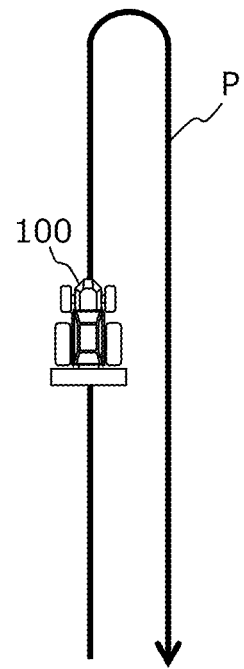

FIGS. 6A to 6C are diagrams showing examples of travel by the work vehicle 100 in the automatic steering mode. FIG. 6A schematically shows how the work vehicle 100 may travel along a linear target path P. FIG. 6B schematically shows how the work vehicle 100 may travel along a curved target path P. FIG. 6C schematically shows how the work vehicle 100 may travel along a target path P that includes two adjacent linear paths and a curved path interconnecting them. The target path P is previously set, and is recorded in the storage device 170. When the work vehicle 100 is traveling in the automatic steering mode, the controller 180 repeats an operation of calculating a deviation (or difference) between the position and orientation of the work vehicle 100 as measured by the positioning device 120 and the target path P and controlling the steering device so as to reduce this deviation. This causes the work vehicle 100 to travel along the target path P.

Figure 7:
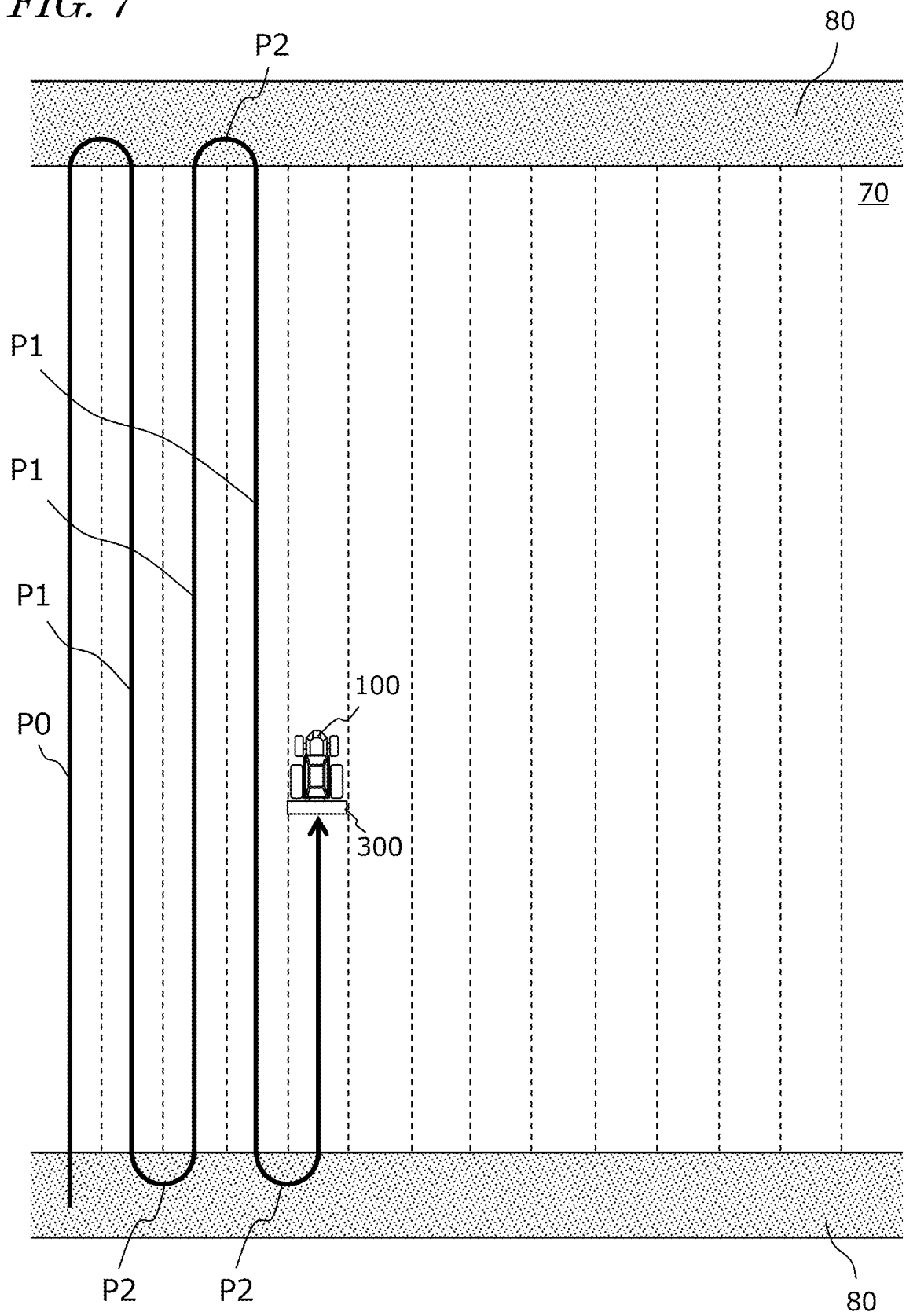
FIG. 7 is a diagram schematically showing an example of a target path of the work vehicle traveling in a field via automatic steering.

FIG. 7 is a diagram schematically showing an example of a target path of the work vehicle 100 traveling in the field via automatic steering. In this example, the field includes a work area 70 in which the work vehicle 100 and the implement 300 perform a task, and headlands 80 that are located near the outer peripheral edge of the field. Through a manipulation of the operational terminal 200, the user may designate which regions on the map of the field would correspond to the work area 70 and the headlands 80 in advance. The target path includes a plurality of parallel main paths P1 and a plurality of turning paths P2 interconnecting the plurality of main paths P1. The main paths P1 are located in the work area 70, whereas the turning paths P2 are located in the headlands 80. Broken lines in FIG. 7 depict the working breadth of the implement 300. The working breadth is previously set and recorded in the storage device 170. The working breadth may be set as the user manipulates the operational terminal 200, and recorded in the storage device 170. Alternatively, the working breadth may be automatically recognized when the implement 300 is connected to the work vehicle 100, and recorded to the storage device 170. The interval between the plurality of main paths P1 is matched to the working breadth. The target path, on the other hand, may be determined based on the user's manipulation, before auto-steer driving is begun.

Next, an example control performed by the controller 180 during automatic steering will be described.

Figure 8:
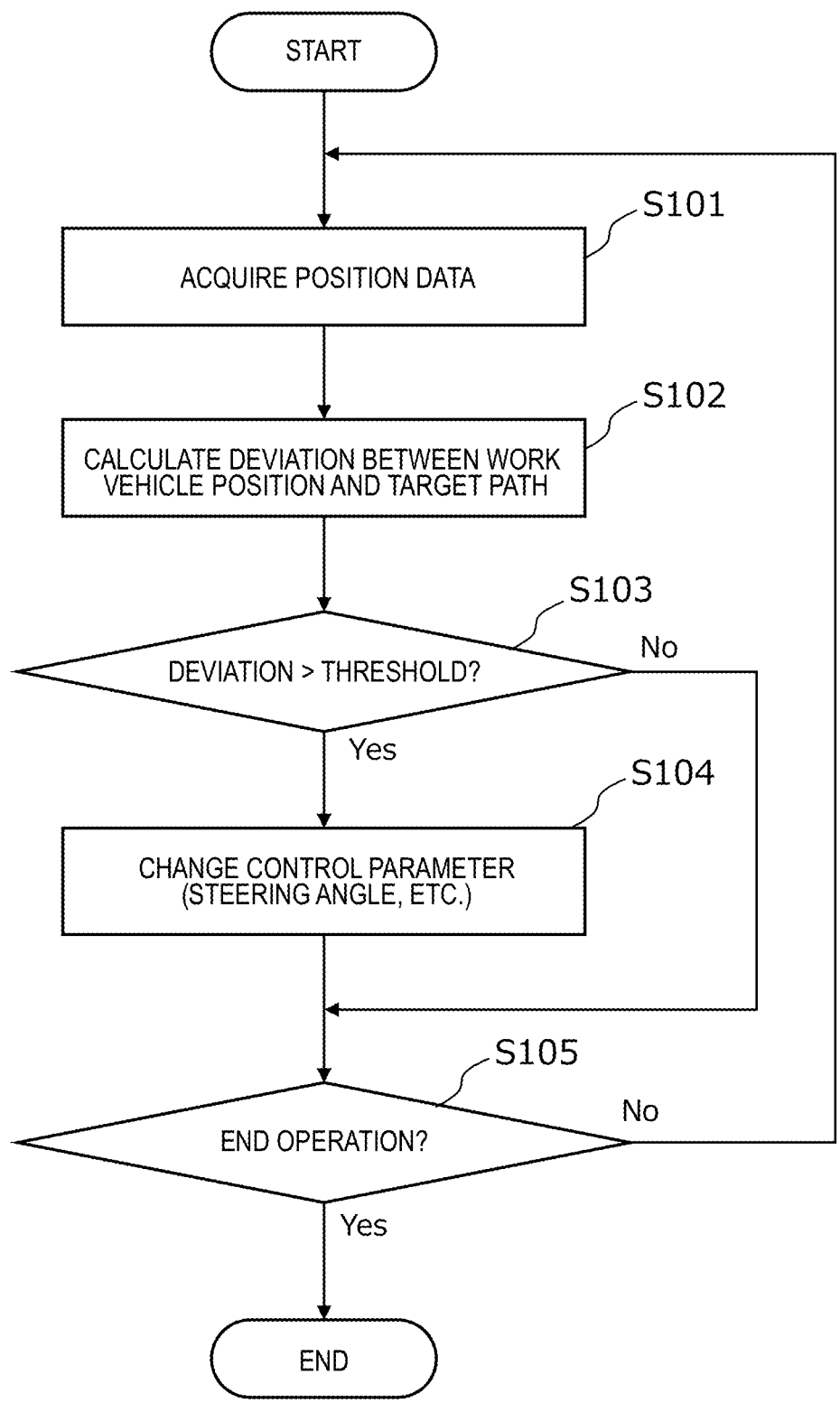
FIG. 8 is a flowchart showing an example operation to be performed by a controller during automatic steering.

FIG. 8 is a flowchart showing an example operation to be performed by the controller 180 during automatic steering. During travel of the work vehicle 100, the controller 180 performs auto-steer driving by performing the operation from steps S101 to S105 shown in FIG. 8. First, the controller 180 acquires data representing the position of the work vehicle 100 that is generated by the positioning device 120 (step S101). Next, the controller 180 calculates a deviation between the position of the work vehicle 100 and the target path (step S102). The deviation represents the distance between the position of the work vehicle 100 and the target path at that moment. The controller 180 determines whether the calculated deviation in position exceeds the previously-set threshold or not (step S103). If the deviation exceeds the thresh-old, the controller 180 changes a control parameter of the steering device included in the drive device 140 so as to reduce the deviation, thus changing the steering angle (step S104). If the deviation does not exceed the threshold at step S103, the operation of step S104 is omitted. At the following step S105, the controller 180 determines whether a command to end operation has been received or not. The command to end operation may be given when the user has used the operational terminal 200 to instruct that the automatic steering mode be suspended, or when the work vehicle 100 has arrived at the destination, for example. If the command to end operation has not been issued, the control returns to step S101 and performs a similar operation based on a newly measured position of the work vehicle 100. The controller 180 repeats the operation from steps S101 to S105 until a command to end operation is given. The aforementioned operation is executed by the ECU 183 in the controller 180.

In the example shown in FIG. 8, the controller 180 controls the drive device 140 based only on a deviation between the position of the work vehicle 100 as identified by the positioning device 120 and the target path. However, a deviation in terms of directions may further be considered in the control. For example, when a directional deviation exceeds a previously-set threshold, where the directional deviation is an angle difference between the orientation of the work vehicle 100 as identified by the positioning device 120 and the direction of the target path, the controller 180 may change the control parameter (e.g., steering angle) of the steering device of the drive device 140 in accordance with the deviation.

Hereinafter, with reference to FIGS. 9A to 9D, an example of steering control by the controller 180 will be described more specifically.

Figure 9A:
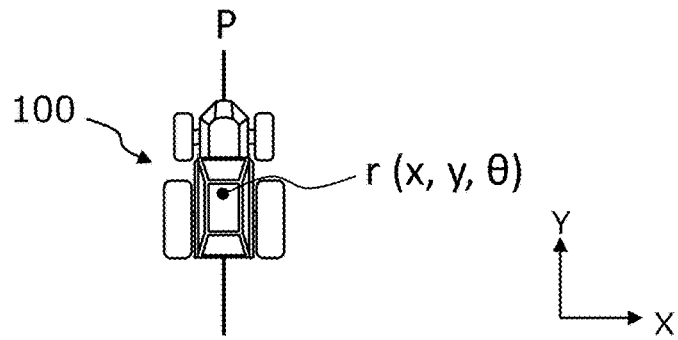
FIG. 9A is a diagram showing an example of a work vehicle that travels along a target path.
Figure 9B:
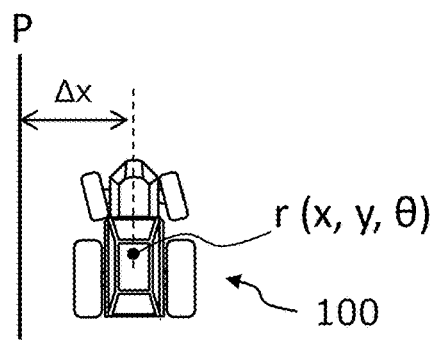
FIG. 9B is a diagram showing an example of a work vehicle at a position which is shifted rightward from the target path.
Figure 9C:
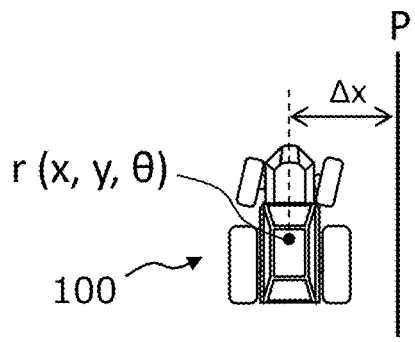
FIG. 9C is a diagram showing an example of a work vehicle at a position which is shifted leftward from the target path.
Figure 9D:
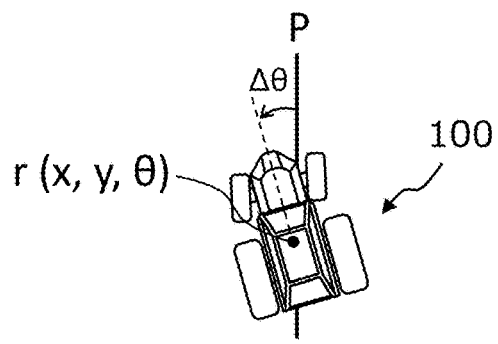
FIG. 9D is a diagram showing an example of a work vehicle which is oriented in an inclined direction with respect to the target path.

FIG. 9A is a diagram showing an example of a work vehicle 100 that travels along a target path P. FIG. 9B is a diagram showing an example of a work vehicle 100 at a position which is shifted rightward from the target path P. FIG. 9C is a diagram showing an example of a work vehicle 100 at a position which is shifted leftward from the target path P. FIG. 9D is a diagram showing an example of a work vehicle 100 which is oriented in an inclined direction with respect to the target path P. In these figures, the pose, i.e., the position and orientation, of the work vehicle 100 as measured by the positioning device 120 is expressed as r(x, y, θ). Herein, (x, y) are coordinates representing the position of a reference point on the work vehicle 100, in an XY coordinate system which is a two-dimensional coordinate system being fixed to the globe. In the examples shown in FIGS. 9A to 9D, the reference point on the work vehicle 100 is at a position on the cabin where a GNSS antenna is disposed, but the reference point may be at any arbitrary position. θ is an angle representing the measured orientation of the work vehicle 100. Although the target path P is shown parallel to the Y axis in the examples illustrated in these figures, generally speaking, the target path P may not necessarily be parallel to the Y axis.

As shown in FIG. 9A, in the case where the position and orientation of the work vehicle 100 are not deviated from the target path P, the controller 180 maintains the steering angle and speed of the work vehicle 100 without changing them.

As shown in FIG. 9B, when the position of the work vehicle 100 is shifted rightward from the target path P, the controller 180 changes the steering angle by changing the angle of rotation of the steering wheel included in the drive device 140 so that the traveling direction of the work vehicle 100 will be inclined leftward, thus bringing the work vehicle 100 closer to the path P. Herein, not only the steering angle but also the speed may be changed. The magnitude of the steering angle may be adjusted in accordance with the magnitude of a positional deviation Δx, for example.

As shown in FIG. 9C, when the position of the work vehicle 100 is shifted leftward from the target path P, the controller 180 changes the steering angle by changing the angle of rotation of the steering wheel so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation Δx, for example.

As shown in FIG. 9D, in the case where the position of the work vehicle 100 is not considerably deviated from the target path P but its orientation is nonetheless different from the direction of the target path P, the controller 180 changes the steering angle so that the directional deviation 40 will become smaller. In this case, too, not only the steering angle but also the speed may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order for the work vehicle 100 to return to the path P, so that the directional deviation Δθ will inevitably have a large absolute value. Conversely, when the positional deviation Δx has a small absolute value, the directional deviation 40 needs to become closer to zero. Therefore, it may be advantageous to introduce a relatively large weight (i.e., control gain) for the directional deviation 40 in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 during travel, the controller 180 may halt the work vehicle 100, or switch from the automatic steering mode to the manual steering mode. Alternatively, when an obstacle is detected, the controller 180 may control the drive device 140 so as to avoid the obstacle.

Next, an example method of determining the traveling direction while the work vehicle 100 is moving at a low speed in the automatic steering mode will be described.

When the work vehicle 100 travels in the automatic steering mode, the controller 180 is able to determine the traveling direction of the work vehicle 100, i.e., whether it is performing forward travel or backward travel, based on a signal that is output from the T/M rotation sensor 156. However, if the moving speed of the work vehicle 100 is as low as below, e.g., about 0.5 km/h, the rotational speed of the wheel axis is not high enough to determine the traveling direction based on a signal from the T/M rotation sensor 156. Therefore, in such a low speed range, the controller 180 may determine the traveling direction based on, for example, chronological position data that is output from a positioning device 120 that utilizes an RTK-GNSS. However, even in the case where a positioning device 120 that is capable of highly accurate positioning is used, the reliability of traveling direction determination based on chronological position data that is output from the positioning device 120 becomes lower in an extremely low speed range where the moving speed of the work vehicle 100 is e.g., below about 0.2 km/h. This is because the actual displacement of the work vehicle 100 is too little relative to fluctuations in the coordinate values of chronological position data, which make it difficult to make the forward/backward travel determination. Therefore, in the present example embodiment, in an extremely low speed range where the vehicle speed is below, e.g., about 0.2 km/h, not only the chronological position data from the positioning device 120 but also the state of the toggling switch 214 to switch between forward travel and backward travel are taken into consideration in determining the traveling direction. This allows for improving the reliability of traveling direction determination in an extremely low speed range.

Figure 10:
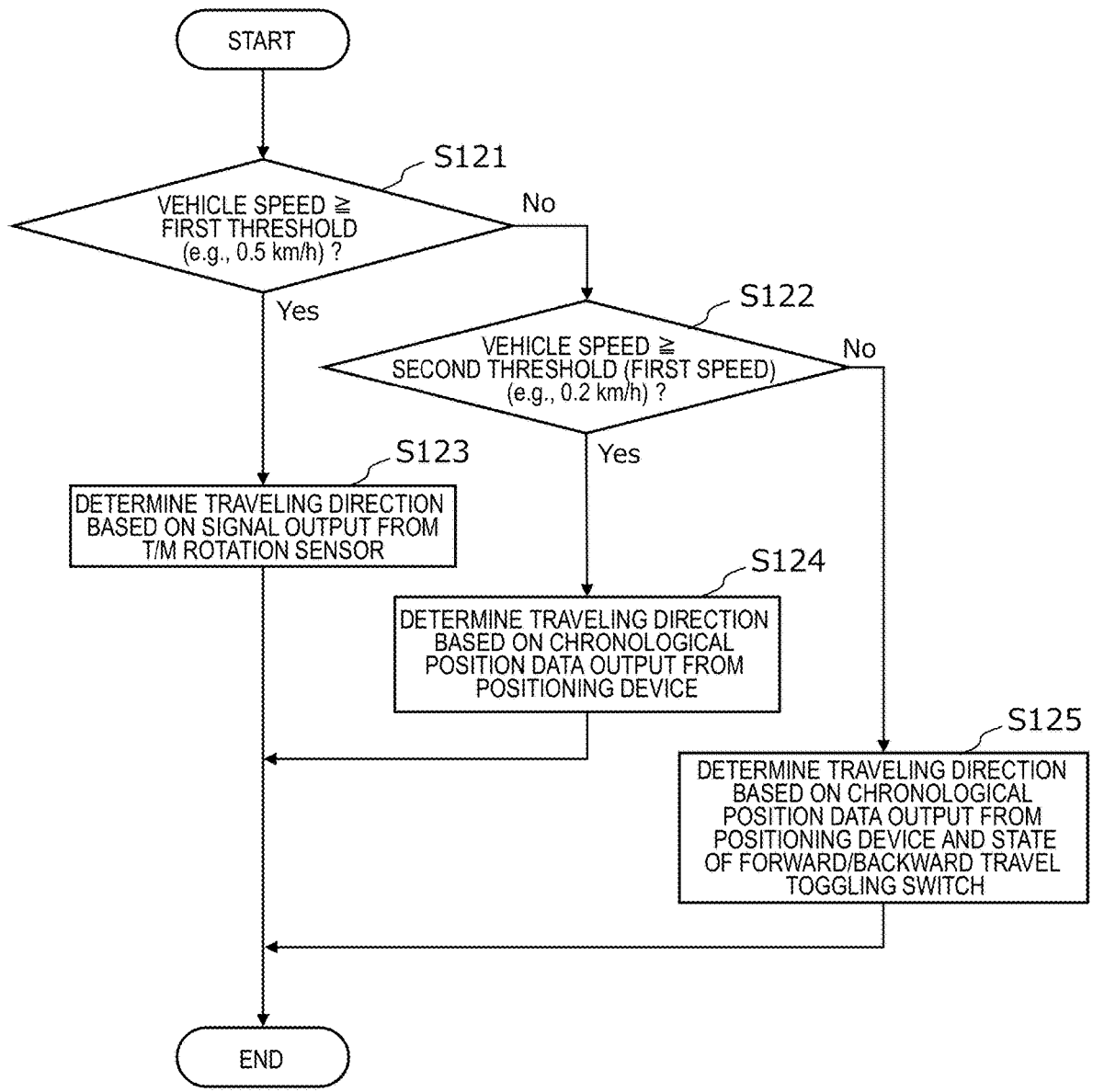
FIG. 10 is a flowchart showing an example method of traveling direction determination which is adapted to the moving speed of the work vehicle.

FIG. 10 is a flowchart showing an example method of traveling direction determination which is adapted to the moving speed of the work vehicle 100 (vehicle speed). The operation shown in FIG. 10 is performed by the ECU 183 in the controller 180. The operation of each step will be described below.

At step S121, the controller 180 determines whether the vehicle speed is equal to or higher than a first threshold. The first threshold may be set to a relatively low value, e.g., about 0.5 km/h. The first threshold may be changed as appropriate, in accordance with the system configuration or the required performance. The first threshold may be set to a value which is not less than about 0.3 km/h and not more than about 1.0 km/h, or not less than about 0.4 km/h and not more than about 0.7 km/h, for example. If the vehicle speed is equal to or higher than the first threshold, the control proceeds to step S123. If the vehicle speed is below the first threshold, the control proceeds to step S122.

At step S122, the controller 180 determines whether the vehicle speed is equal to or higher than a second threshold which is smaller than the first threshold. The second threshold corresponds to the aforementioned "first speed", and may be set to a low value, e.g., about 0.2 km/h. The second threshold may be changed as appropriate, in accordance with the system configuration or the required performance. The second threshold (first speed) may be set to a value which is not less than about 0.1 km/h and not more than about 0.3 km/h, or not less than about 0.15 km/h and not more than about 0.25 km/h, for example. If the vehicle speed is equal to or higher than the second threshold, the control proceeds to step S124. If the vehicle speed is below the second threshold, the control proceeds to step S125.

At steps S121 and S122, the controller 180 is able to estimate the vehicle speed based on a signal that is output from the T/M rotation sensor 156 or chronological position data that is output fro the positioning device 120. For example, when the vehicle speed is equal to or higher than the first threshold, the vehicle speed can be estimated based on the signal that is output from the T/M rotation sensor 156. On the other hand, when the vehicle speed is below the first threshold, the vehicle speed can be estimated based on chronological position data that is output from the positioning device 120. A signal that is output from the IMU 125 may be utilized in the estimation of the vehicle speed.

At step S123, the controller 180 determines the traveling direction (i.e., forward travel or backward travel) of the work vehicle 100 based on the signal that is output from the T/M rotation sensor 156. When the vehicle speed is equal to or higher than the first threshold, the traveling direction can be accurately determined based on the signal that is output from the T/M rotation sensor 156.

At step S124, the controller 180 determines the traveling direction of the work vehicle 100 based on the chronological position data that is output from the positioning device 120. When the vehicle speed is below the first threshold, the traveling direction can be accurately determined based on the signal that is output from the T/M rotation sensor 156. Therefore, the controller 180 determines the traveling direction based on the chronological position data that is output from the positioning device 120, i.e., changes over time of the coordinate values.

At step S125, the controller 180 determines the traveling direction of the work vehicle 100 based on the chronological position data that is output from the positioning device 120 and on the state of the toggling switch 214 to switch between forward travel and backward travel. When the vehicle speed is lower than the second threshold (first speed), even in the case where the positioning device 120 outputs highly accurate position data utilizing an RTK-GNSS, the traveling direction determination based on that position data may be prone to error. Therefore, when the vehicle speed is lower than the second threshold (first speed), not only the chronological position data that is output from the positioning device 120 but also the state of the toggling switch 214 is relied on in determining the traveling direction. For example, if a traveling direction that is estimated from the chronological position data and a traveling direction indicated by the toggling switch 214 coincide, the controller 180 determines that the work vehicle 100 is moving in that traveling direction. This allows for improving the reliability of traveling direction de-termination.

During the operation of the work vehicle 100, the controller 180 repeats the operation from steps S121 to S125. The traveling direction determination illustrated in FIG. 10 is performed regardless of whether auto-steer driving is being performed or not.

Through the above operation, even in an extremely low speed range where the vehicle speed is below the first speed, it becomes possible to determine the traveling direction of the work vehicle 100 more accurately. This allows for improving the reliability of automatic steering in an extremely low speed range.

In the present example embodiment, in the automatic steering mode, the controller 180 may transition to a standby mode where the automatic steering is temporarily canceled if a switching manipulation between forward travel and backward travel is made with the toggling switch 214 while the moving speed of the work vehicle 100 is lower than the first speed. Furthermore, if a predetermined resuming condition is satisfied within a predetermined time (which hereinafter may be referred to as "first time") since a point in time of transitioning to the standby mode, the automatic steering mode may be resumed from the standby mode. The resuming condition may include a condition that "a traveling direction that is estimated from the chronological position data and a traveling direction indicated by the toggling switch 214 coincide" (first condition), for example. The first time is, e.g., about 5 seconds or about 10 seconds, and may be previously set. The first time may be set to a duration of not less than about 1 second and not more than about 30 seconds, for example.

The resuming condition may further include a condition that "the moving speed of the work vehicle is equal to or higher than a second speed" (second condition). Herein, the second speed may be set a value which is equal to or lower than the first speed. For example, when the first speed is about 0.2 km/h, the second speed may be set to a value which is lower than lower than the first speed, e.g., about 0.1 km/h or about 0.15 km/h. The second speed may be set to the same value as the first speed, or a value which is higher than the first speed.

The work vehicle 100 according to the present example embodiment includes the prime mover 102, the transmission 103, and a clutch to switch between transmitting and not transmitting motive power from the prime mover 102 to the transmission 103. The clutch is operated by the clutch pedal 212. In this case, the resuming condition may further include a condition that "the clutch is engaged" (third condition). The controller 180 may determine that the clutch is engaged when the clutch pedal 212 is not being stepped on, i.e., in the absence of the user's manipulation of disengaging the clutch, for example. The determination by the controller 180 as to whether the clutch is engaged or not may be based on a signal from a sensor that is provided on the clutch pedal 212. When the clutch is not engaged (i.e., the clutch is disengaged), motive power from the prime mover 102 is not transmitted to the transmission 103, and thus the rotation direction of the wheel axis is not changed. For this reason, the resuming condition may include the third condition.

After transitioning to the standby mode, if the moving speed of the work vehicle 100 exceeds the first speed within a predetermined time, the controller 180 may resume the automatic steering mode regardless of whether or not the first condition or any other conditions are satisfied. The reason is that, when the moving speed exceeds the first speed, irrespective of the state of the toggling switch 214, it is possible to relatively accurately determine the traveling direction based on the chronological position data from the positioning device 120.

If the resuming condition is not satisfied within a predetermined time since a point in time of transitioning to the standby mode, the controller 180 may transition from the standby mode to the manual steering mode. Once in the manual steering mode, the controller 180 maintains the manual steering mode until the user makes the manipulation of switching to the self-driving mode.

Hereinafter, with reference to FIG. 11 to FIG. 13, a specific example of an operation when a switching manipulation between forward/backward travel is made with the toggling switch 214 while traveling at a low speed will be described.

Figure 11:
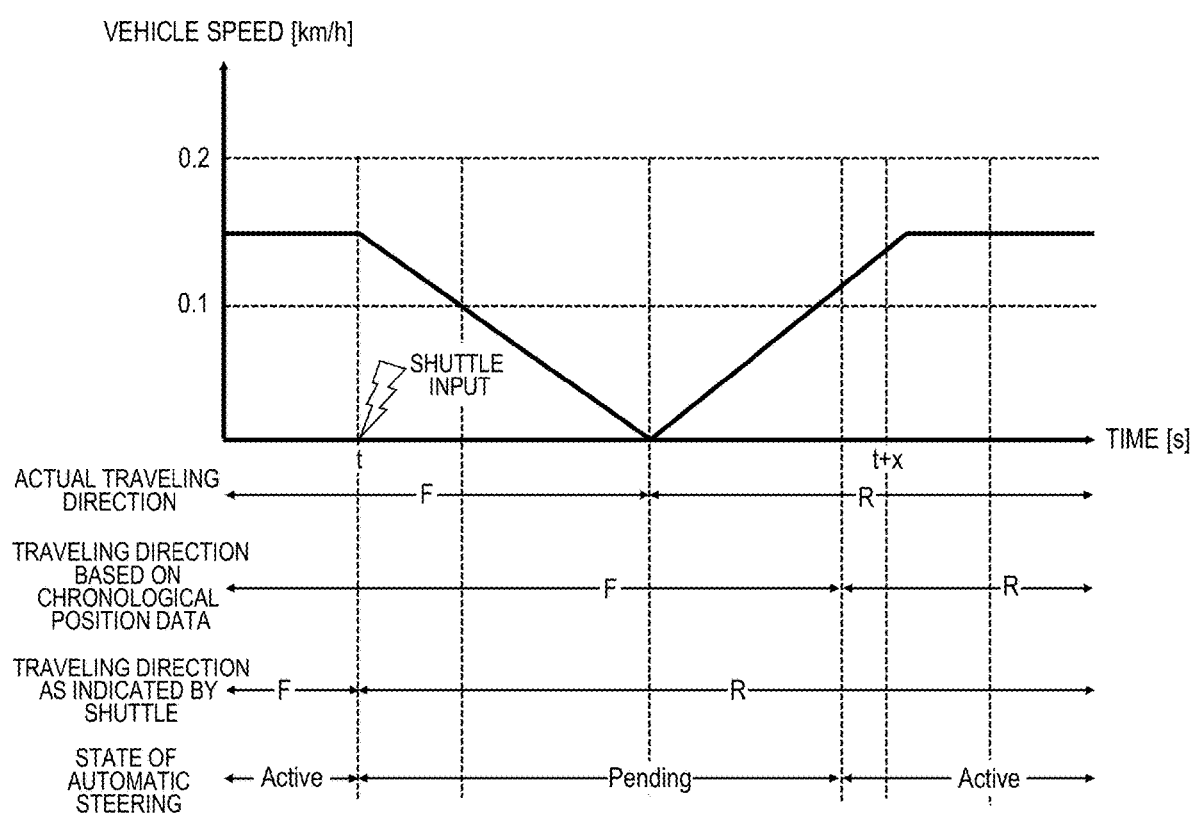
FIG. 11 is a diagram showing an example operation of mode change in automatic steering in a case where a toggling switch is manipulated while the work vehicle is traveling at a low speed.
Figure 12:
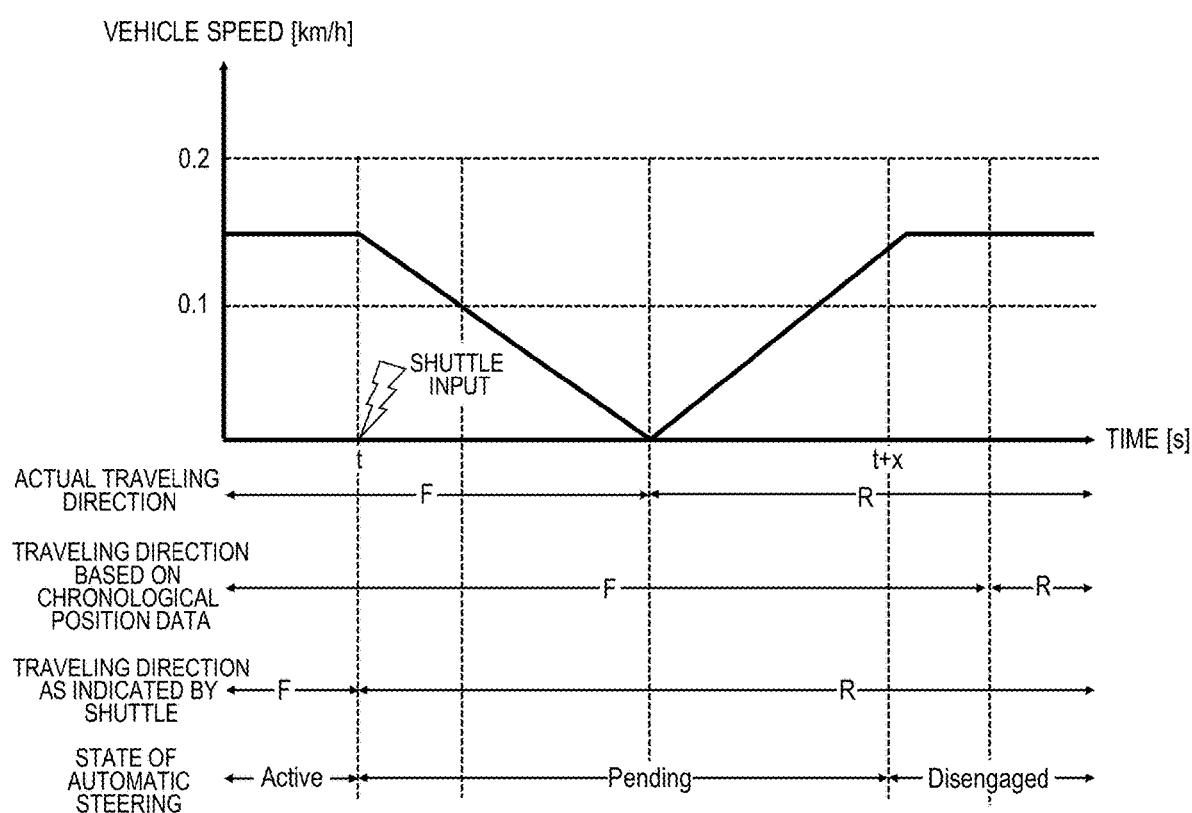
FIG. 12 is a diagram showing another example operation of mode change in automatic steering in a case where a toggling switch is manipulated while the work vehicle is traveling at a low speed.
Figure 13:
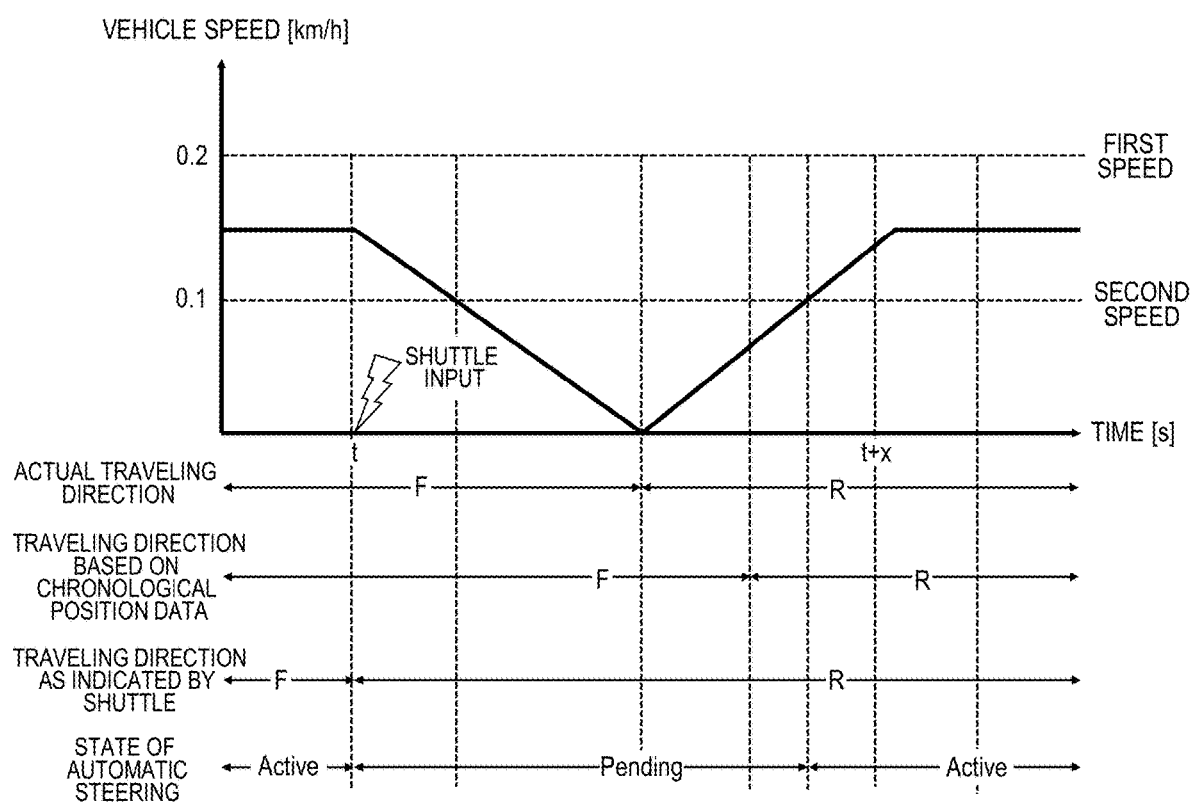
FIG. 13 is a diagram showing still another example operation of mode change in automatic steering in a case where a toggling switch is manipulated while the work vehicle is traveling at a low speed.

FIG. 11 to FIG. 13 show example operations of mode change in automatic steering in a case where the toggling switch 214 (which in this example is a shuttle lever) is manipulated while the work vehicle 100 is traveling at a low speed. The graphs shown in FIG. 11 to FIG. 13 depict examples of change over time of the actual vehicle speed (absolute value) of the work vehicle 100. Under each graph, the actual traveling direction of the work vehicle 100, the traveling direction based on chronological position data that is output from the positioning device 120, the traveling direction indicated by the shuttle lever, and the state of automatic steering are shown. Forward travel is expressed as "F", backward travel as "R", the automatic steering mode as "Active", the standby mode as "Pending", and the manual steering mode as "Disengaged". The traveling direction based on the chronological position data is a traveling direction based on GNSS data, as may be estimated by the processor 126 of the positioning device 120, for example.

Figure 14:
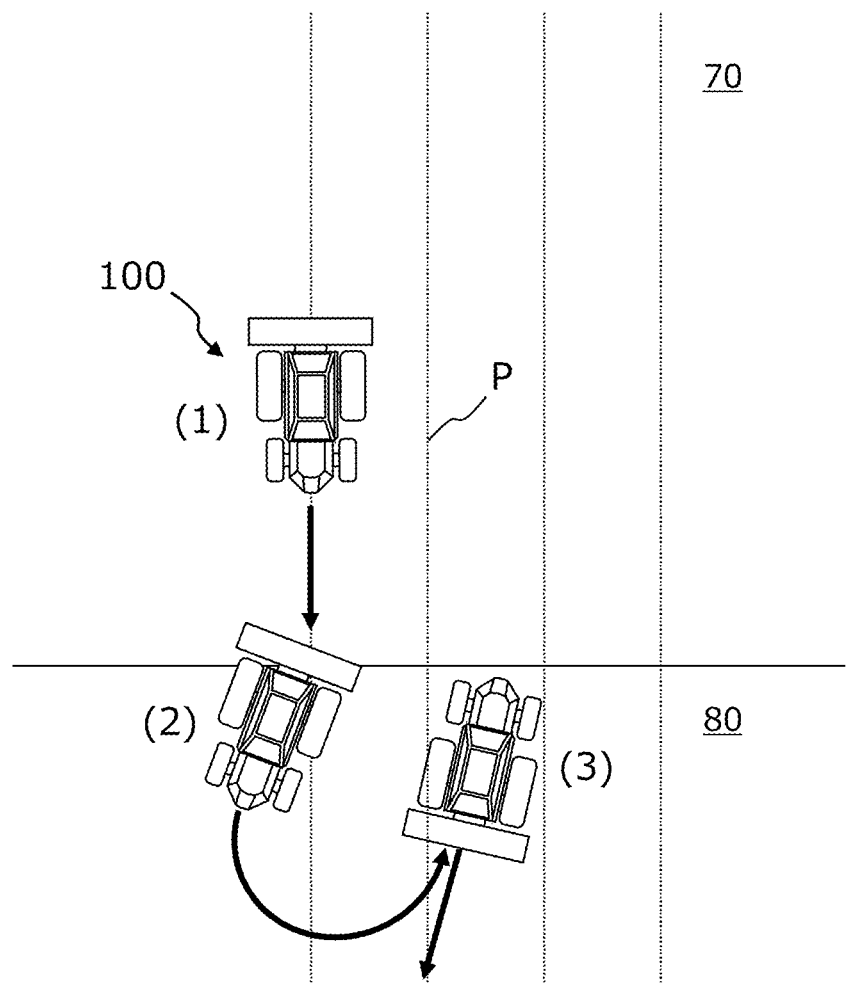
FIG. 14 is a diagram showing a situation where an operation of switching from forward travel to backward travel is performed.

In the example of FIG. 11, while the work vehicle 100 is traveling forward at, for example, about 0.15 km/h in the automatic steering mode, the user (i.e., driver) manipulates the toggling switch 214 (i.e., shuttle lever) at time t to make a switching manipulation from forward travel to backward travel. Such a manipulation is made in a case where, as exemplified in e.g., FIG. 14, after the work vehicle 100 is made to turn in a headland 80 outside the work area 70 of the field, the work vehicle 100 once performs backward travel in order to approach a target path P, for example. In response to the switching manipulation of the shuttle lever, the controller 180 temporarily cancels the automatic steering, and transitions to the standby mode (Pending). Even after the user has switched the shuttle lever, the state of forward travel continues for a while, until the actual traveling direction of the work vehicle 100 switches to the backward direction at a certain moment. Thereafter, the backward speed of the work vehicle 100 gradually increases, until at one moment the traveling direction that is estimated based on the chronological position data changes from the forward direction (F) to the backward direction (R). As a result of this, the traveling direction that is estimated based on the chronological position data and the traveling direction indicated by the shuttle lever coincide. In the example of FIG. 11, both traveling directions coincide before a predetermined time x (e.g., about 5 seconds or about 10 seconds) passes from time t. Before the lapse of the predetermined time x since detection of the switching manipulation between forward/backward travel, upon detecting the coincidence of the traveling direction based on the chronological position data and the traveling direction indicated by the shuttle lever, the controller 180 changes the state of automatic steering from "Pending" to "Active". In other words, the automatic steering mode is resumed from the standby mode. Thereafter, the controller 180 causes the work vehicle 100 to travel backward in the automatic steering mode.

On the other hand, in the example shown in FIG. 12, the traveling direction that is estimated by the chronological position data that is output from the positioning device 120 remains to be forward direction (F) even after the predetermined time x has passed since the switching manipulation of the shuttle lever. In this case, as soon as the predetermined time x has passed since the time t of performing the switching manipulation, the controller 180 changes the state of automatic steering from "Pending" to "Disengaged". In other words, the standby mode transitions to the manual steering mode. Thereafter, even if the traveling direction based on the chronological position data is inverted to the backward direction (R), the manual steering mode is continued. Thereafter, the manual steering mode is maintained until the user makes a manipulation of starting the automatic steering mode.

When transitioning from the standby mode to the manual steering mode, the controller 180 may cause a display device (i.e., display), e.g., that of the operational terminal 200, to display an alert, or cause the buzzer 220 to generate an alarm sound. Moreover, during travel of the work vehicle 100, the controller 180 may cause the display device to indicate which one of the automatic steering mode, the standby mode, and the manual steering mode the current mode is. The controller 180 may cause the display device of the operational terminal 200 to indicate a result of determination of the traveling direction of the work vehicle 100.

Figure 15:
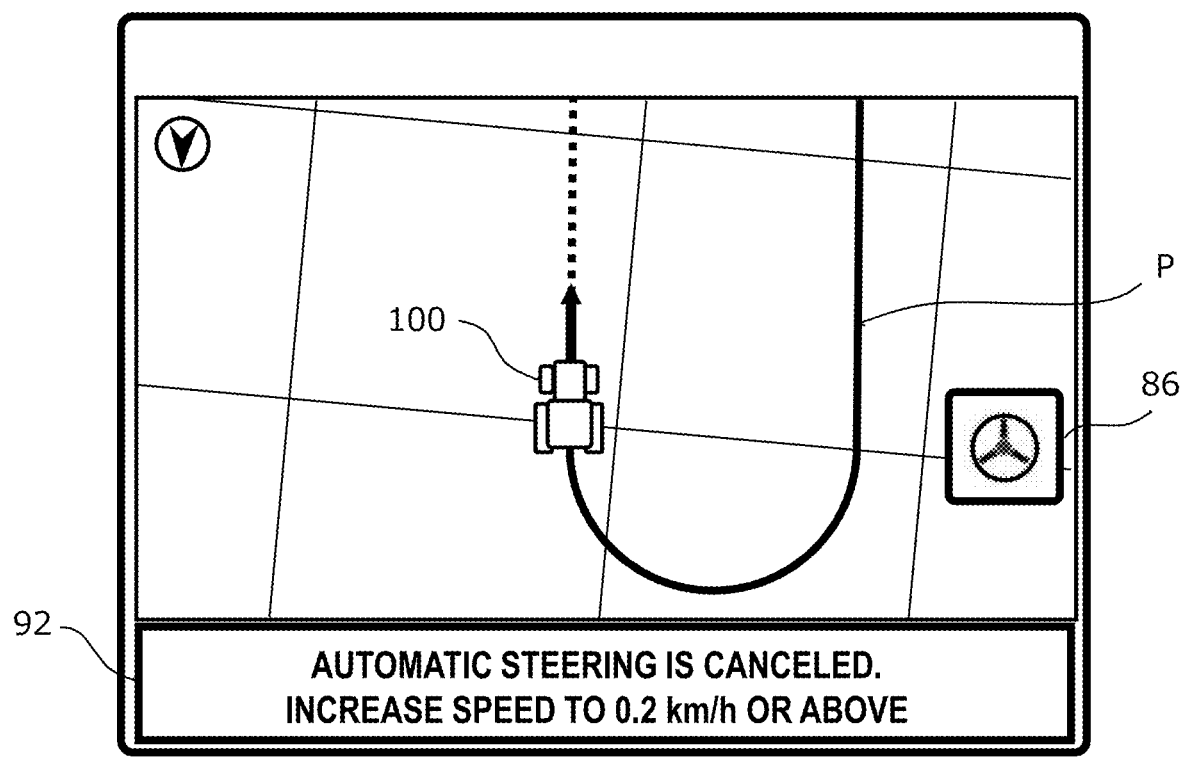
FIG. 15 is a diagram showing an example indication on the operational terminal.

FIG. 15 is a diagram showing an example indication on the operational terminal 200. In this example, the controller 180 causes the display of the operational terminal 200 to display a map of a field that contains the work vehicle 100 and the target path P. The controller 180 may indicate the result of determining the traveling direction of the work vehicle 100 (forward travel or backward travel) with an arrow on the display, as shown in FIG. 15. In the example of FIG. 15, an icon 86 indicating ON/OFF of the automatic steering mode and an alert message 92 are being displayed. With the color of the icon 86, the controller 180 may express which one of the automatic steering mode (Active), the standby mode (Pending), and the manual steering mode (Disengaged) the current mode is, for example. For instance, the icon 86 of the color may be changed so that "Active" is expressed as green, "Pending" as yellow, and "Disengaged" as gray. When switching from "Pending" to "Disengaged", the controller 180 may also cause the operational terminal 200 to indicate an alert message 92 to urge the user increase speed, e.g., "AUTOMATIC STEERING IS CANCELED. INCREASE SPEED TO 0.2 km/h OR ABOVE". In addition to such an alert indication, the controller 180 may cause the buzzer 220 to generate an alarm sound. By outputting such an alert, the user can be effectively notified that automatic steering has been canceled.

In the examples of FIG. 11 and FIG. 12, the user is illustrated as manipulating the toggling switch 214 so as to switch from forward travel to backward travel while the work vehicle 100 is traveling forward at a low speed. However, in some cases the user may switch from backward travel to forward travel. The controller 180 may perform similar control to the above also when the user manipulates the toggling switch 214 so as to switch from backward travel to forward travel while the work vehicle 100 is traveling backward at a low speed.

In the example of FIG. 11, "Active" is resumed from "Pending" as soon as the traveling direction based on the chronological position data and the traveling direction indicated by the toggling switch 214 coincide, within the predetermined time x (first time) since the user's switching manipulation between forward travel and backward travel. In other words, the automatic steering mode is resumed from the standby mode when the first condition is satisfied. Not only the first condition but also the second condition, i.e., that the vehicle speed has exceeded the second speed, may be imposed. In other words, the controller 180 may resume the automatic steering mode from the standby mode when a resuming condition that includes both the first condition and the second condition is satisfied. The second speed may be set to a value lower than the first speed, e.g., about 0.1 km/h.

FIG. 13 is a diagram showing an example where the automatic steering mode is resumed from the standby mode when both the first condition and the second condition are satisfied. In the example of FIG. 13, the timing at which the traveling direction that is estimated based on the chronological position data switches from the forward direction (F) to the backward direction (R) comes earlier than in the example of FIG. 11. At that timing, the vehicle speed is below the second speed (e.g., about 0.1 km/h in the example of FIG. 13) Therefore, the automatic steering has not become "Active" but is still "Pending" (standby mode). Thereafter, as the backward speed of the vehicle 100 increases and exceeds the second speed, a transition from "Pending" to "Active" occurs. As in this example, the controller 180 may resume the automatic steering mode from the standby mode when a resuming condition that includes both the first condition and the second condition is satisfied.

The control shown in FIG. 11 to FIG. 13 is based on the premise that, after the user stepped on the clutch pedal 212 to manipulate the toggling switch 214 (shuttle lever), the clutch pedal 212 is returned to a state of not being stepped on (i.e., the clutch being engaged). In other words, when a resuming condition that includes the first condition and the third condition, or a resuming condition that includes all of the first condition, the second condition, and the third condition is satisfied, the controller 180 resumes the automatic steering mode from the standby mode. However, there may be cases where the user who has manipulated the toggling switch 214 keeps on stepping on the clutch pedal 212, without letting it go. In that case, because the clutch keeps being disengaged, the actual traveling direction of the work vehicle 100 does not change. Also, the user may even switch the toggling switch 214 to neutral in order to halt the work vehicle 100. In that case, too, because motive power is cut off within the transmission, the actual traveling direction of the work vehicle 100 does not change. In order to cope with these situations, in the automatic steering mode, the controller 180 may switch from the automatic steering mode to the manual steering mode if the neutral state of the toggling switch 214 or the disengaged state of the clutch (e.g., the clutch pedal 212 being stepped on) continues for a predetermined time (which hereinafter may be referred to as a "second time") or longer. The second time may be identical to or different from the first time. The second time may be set to a duration of not less than about 1 second and not more than about 30 seconds, for example. In the automatic steering mode, until the second time passes since the toggling switch 214 became neutral or the clutch became disengaged, the controller 180 may continue in the automatic steering mode if the moving speed is equal to or higher than the first speed (e.g., about 0.2 km/h), and transition from the automatic steering mode to the standby mode if the moving speed is below the first speed. Through such control, the mode can be appropriately switched even when the user keeps stepping on the clutch pedal 212 or switches the shuttle lever to neutral.

As described above and illustrated in FIG. 10 with respect to the present example embodiment, in the automatic steering mode, the controller 180 determines the traveling direction based on a signal that is output from the T/M rotation sensor 156 when the vehicle speed is equal to or higher than the first threshold (third speed). On the other hand, when the vehicle speed is equal to or higher than the second threshold (first speed) but below the first threshold (third speed), the controller 180 determines the traveling direction of the work vehicle 100 based on chronological position data, irrespective of the state of the toggling switch 214. However, such control is only an example. Without setting a third speed, the controller 180 may determine the traveling direction based on chronological position data when the vehicle speed is equal to or higher than the first speed, irrespective of the state of the toggling switch 214. Alternatively, in the case where the first speed is set to a value near about 0.5 km/h, for example, the traveling direction may be determined based on a signal that is output from the T/M rotation sensor 156 when the vehicle speed is equal to or higher than the first speed, irrespective of the state of the toggling switch 214.

In the above example embodiments, the work vehicle 100 may be an unmanned work vehicle which performs self-driving. In that case, component elements which are only required for human driving, e.g., the cabin, the driver's seat, the steering wheel, and the operational terminal, do not need to be provided in the work vehicle 100. The unmanned work vehicle may perform a similar operation to the operation according to any of the above example embodiments via autonomous driving, or by remote manipulations by a user.

A control system that provides the various functions according to the above example embodiments can be mounted to a work vehicle lacking such functions as an add-on. Such a control system may be manufactured and sold independently from the work vehicle. A computer program for use in such a control system may also be manufactured and sold independently from the work vehicle. The computer program may be provided in a form stored in a computer-readable, non-transitory storage medium, for example. The computer program may also be provided through downloading via telecommunication lines (e.g., the Internet).

Thus, example embodiments of the present disclosure encompasses work vehicles, control systems, and control methods as exemplified in the following Items.

[Item 1]

A work vehicle capable of performing auto-steer driving in both of forward travel and backward travel includes a position sensor to output chronological position data of the work vehicle, a controller configured or programmed to, in an automatic steering mode, perform steering control for the work vehicle based on the chronological position data and a target path that is previously set, and a toggling switch to switch between forward travel and backward travel of the work vehicle, wherein in the automatic steering mode, when a moving speed of the work vehicle is lower than a first speed, the controller is configured or programmed to determine a traveling direction of the work vehicle based on the chronological position data and a state of the toggling switch.

[Item 2]

The work vehicle of Item 1, wherein, in the automatic steering mode, if a switching manipulation between forward travel and backward travel is performed using the toggling switch while the moving speed is lower than the first speed, the controller is configured or programmed to transition to a standby mode where the automatic steering is temporarily canceled.

[Item 3]

The work vehicle of Item 2, wherein the automatic steering mode is resumed from the standby mode if a resuming condition is satisfied within a predetermined first time since a point in time of transitioning to the standby mode, the resuming condition including a first condition that a traveling direction is estimated from the chronological position data and a traveling direction is indicated by the toggling switch coincide.

[Item 4]

The work vehicle of Item 3, wherein the resuming condition includes a second condition that the moving speed of the work vehicle is equal to or higher than a second speed.

[Item 5]

The work vehicle of Item 4, wherein the second speed is equal to or lower than the first speed.

[Item 6]

The work vehicle of any of Items 3 to 5, wherein the controller is configured or programmed to transition from the standby mode to a manual steering mode if the resuming condition is not satisfied within the first time since the point in time of transitioning to the standby mode, and in the manual steering mode, maintain the manual steering mode until a manipulation of switching to the automatic steering mode is performed by a user.

[Item 7]

The work vehicle of Item 6, wherein, when transitioning from the standby mode to the manual steering mode, the controller is configured or programmed to cause a display to indicate an alert to urge a driver to increase speed.

[Item 8]

The work vehicle of any of Items 3 to 7, further including a prime mover, a transmission, and a clutch to switch between transmitting and not transmitting motive power from the prime mover to the transmission, wherein the resuming condition further includes a third condition that the clutch is engaged.

[Item 9]

The work vehicle of Item 8, wherein the toggling switch is operable to switch between forward travel, neutral, and backward travel, and in the automatic steering mode, the controller is configured or programmed to transition from the automatic steering mode to the manual steering mode when the toggling switch has continued to be neutral, or when the clutch has continued to be disengaged, for a predetermined second time or longer.

[Item 10]

The work vehicle of Item 9, wherein, in the automatic steering mode, until the second time passes since the toggling switch became neutral or the clutch became disengaged, the controller is configured or programmed to continue in the automatic steering mode if the moving speed is equal to or higher than the first speed, and transition from the automatic steering mode to the standby mode if the moving speed is below the first speed.

[Item 11]

The work vehicle of any of Items 1 to 10, wherein the first speed is not less than about 0.15 km/h and not more than about 0.25 km/h.

[Item 12]

The work vehicle of any of Items 1 to 11, wherein, in the automatic steering mode, if the moving speed is equal to or higher than the first speed but below the third speed, the controller is configured or programmed to determine the traveling direction of the work vehicle based on the chronological position data, irrespective of the state of the toggling switch.

[Item 13]

The work vehicle of any of Items 1 to 12, wherein the position sensor includes a GNSS receiver.

[Item 14]

The work vehicle of any of Items 1 to 13, wherein the controller is configured or programmed to cause a display to indicate a result of determination of the traveling direction of the work vehicle.

[Item 15]

A control system for a work vehicle that is capable of performing auto-steer driving in both of forward travel and backward travel, the work vehicle including a position sensor to output chronological position data of the work vehicle and a toggling switch to switch between forward travel and backward travel of the work vehicle, the control system including a controller configured or programmed to, in an automatic steering mode, perform steering control for the work vehicle based on the chronological position data and a target path that is previously set, and in the automatic steering mode, when a moving speed of the work vehicle is lower than a first speed, the controller is configured or programmed to determine a traveling direction of the work vehicle based on the chronological position data and a state of the toggling switch.

[Item 16]

A control method for a work vehicle that is capable of performing auto-steer driving in both of forward travel and backward travel, the work vehicle including a position sensor to output chronological position data of the work vehicle and a toggling switch to switch between forward travel and backward travel of the work vehicle, the control method including, in an automatic steering mode, performing steering control for the work vehicle based on the chronological position data and a target path that is previously set, and in the automatic steering mode, when a moving speed of the work vehicle is lower than a first speed, determining a traveling direction of the work vehicle based on the chronological position data and a state of the toggling switch.

The techniques according to example embodiments of the present disclosure are applicable to work vehicles for use in agricultural applications, e.g., tractors, transplanters, or harvesters. The techniques according to example embodiments of the present disclosure are also applicable to work vehicles for use in non-agricultural applications, e.g., construction vehicles or snowplow vehicles.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle capable of performing auto-steer driving in both of forward travel and backward travel, comprising:
a position sensor to output chronological position data of the work vehicle;

a controller configured or programmed to, in an automatic steering mode, perform steering control for the work vehicle based on the chronological position data and a target path that is previously set; and
a toggling switch to switch between forward travel and backward travel of the work vehicle; wherein
the controller is configured or programmed to:
  in the automatic steering mode, when a moving speed of the work vehicle is lower than a first speed, determine a traveling direction of the work vehicle based on the chronological position data and a state of the toggling switch;
  in the automatic steering mode, if a switching operation between forward travel and backward travel is performed using the toggling switch while the moving speed is lower than the first speed, transition to a standby mode in which the automatic steering is temporarily canceled;
  resume the automatic steering mode from the standby mode if a resuming condition is satisfied within a predetermined first time from a time of transitioning to the standby mode, the resuming condition including a first condition that a traveling direction estimated from the chronological position data coincides with a traveling direction indicated by the toggling switch;
  transition from the standby mode to a manual steering mode if the resuming condition is not satisfied within the first time from the time of transitioning to the standby mode; and
  in the manual steering mode, maintain the manual steering mode until a user performs an operation to switch to the automatic steering mode.

2. The work vehicle of claim 1, wherein the resuming condition includes a second condition that the moving speed of the work vehicle is equal to or higher than a second speed.

3. The work vehicle of claim 2, wherein the second speed is equal to or lower than the first speed.

4. The work vehicle of claim 1, wherein, when transitioning from the standby mode to the manual steering mode, the controller is configured or programmed to cause a display to indicate an alert to urge a driver to increase speed.

5. The work vehicle of claim 1, further comprising:
a prime mover;
a transmission; and
a clutch to switch between transmitting and not transmitting motive power from the prime mover to the transmission; wherein
the resuming condition further includes an additional condition that the clutch is engaged.

6. The work vehicle of claim 5, wherein
the toggling switch is operable to switch between forward travel, neutral, and backward travel; and
in the automatic steering mode, the controller is configured or programmed to:
transition from the automatic steering mode to the manual steering mode when the toggling switch has continued to be neutral, or when the clutch has continued to be disengaged, for a predetermined second time or longer.

7. The work vehicle of claim 6, wherein, in the automatic steering mode, until the second time passes since the toggling switch became neutral or the clutch became disengaged, the controller is configured or programmed to:
continue in the automatic steering mode if the moving speed is equal to or higher than the first speed; and
transition from the automatic steering mode to the standby mode if the moving speed is below the first speed.

8. The work vehicle of claim 1, wherein the first speed is not less than 0.15 km/h and not more than 0.25 km/h.

9. The work vehicle of claim 1, wherein, in the automatic steering mode, if the moving speed is equal to or higher than the first speed but below a second speed, the controller is configured or programmed to determine the traveling direction of the work vehicle based on the chronological position data, irrespective of the state of the toggling switch.

10. The work vehicle of claim 1, wherein the position sensor includes a GNSS receiver.

11. The work vehicle of claim 1, wherein the controller is configured or programmed to cause a display to indicate a result of determination of the traveling direction of the work vehicle.

12. A control system for a work vehicle that is capable of performing auto-steer driving in both of forward travel and backward travel, the work vehicle including a position sensor to output chronological position data of the work vehicle and a toggling switch to switch between forward travel and backward travel of the work vehicle, the control system comprising:
a controller configured or programmed to:
  in an automatic steering mode, perform steering control for the work vehicle based on the chronological position data and a target path that is previously set;
  in the automatic steering mode, when a moving speed of the work vehicle is lower than a first speed, determine a traveling direction of the work vehicle based on the chronological position data and a state of the toggling switch;
  in the automatic steering mode, if a switching operation between forward travel and backward travel is performed using the toggling switch while the moving speed is lower than the first speed, transition to a standby mode in which the automatic steering is temporarily canceled;
  resume the automatic steering mode from the standby mode if a resuming condition is satisfied within a predetermined first time from a time of transitioning to the standby mode, the resuming condition including a first condition that a traveling direction estimated from the chronological position data coincides with a traveling direction indicated by the toggling switch;
  transition from the standby mode to a manual steering mode if the resuming condition is not satisfied within the first time from the time of transitioning to the standby mode; and
  in the manual steering mode, maintain the manual steering mode until a user performs an operation to switch to the automatic steering mode.

13. A control method for a work vehicle that is capable of performing auto-steer driving in both of forward travel and backward travel, the work vehicle including a position sensor to output chronological position data of the work vehicle and a toggling switch to switch between forward travel and backward travel of the work vehicle, the control method comprising:
in an automatic steering mode, performing steering control for the work vehicle based on the chronological position data and a target path that is previously set; and
in the automatic steering mode, when a moving speed of the work vehicle is lower than a first speed, determining a traveling direction of the work vehicle based on the chronological position data and a state of the toggling switch;

in the automatic steering mode, performing a switching operation between forward travel and backward travel using the toggling switch while the moving speed is lower than the first speed, and transitioning to a standby mode in which the automatic steering is temporarily canceled; canceled based on the switching operation;

determining that a resuming condition is not satisfied within a predetermined first time from a time of transitioning to the standby mode, the resuming condition including a first condition that a traveling direction estimated from the chronological position data coincides with a traveling direction indicated by the toggling switch;

transitioning from the standby mode to a manual steering mode based on the resuming condition being not satisfied within the first time from the time of transitioning to the standby mode; and in the manual steering mode, maintaining the manual steering mode until a user performs an operation to switch to the automatic steering mode.

* * * * *